United States Patent
Nakamura et al.

(10) Patent No.: US 11,376,972 B2
(45) Date of Patent: Jul. 5, 2022

(54) NOTIFICATION CONTROLLER, MOBILE BODY, ELECTRIC POWER SYSTEM, AND NOTIFICATION METHOD

(71) Applicant: Toyota Jidosha Kabushiki Kaisha, Toyota (JP)

(72) Inventors: Toru Nakamura, Toyota (JP); Tadatsugu Udono, Toyota (JP); Chiaki Kanda, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 45 days.

(21) Appl. No.: 17/074,982

(22) Filed: Oct. 20, 2020

(65) Prior Publication Data
US 2021/0129689 A1 May 6, 2021

(30) Foreign Application Priority Data
Oct. 30, 2019 (JP) .............................. JP2019-197054

(51) Int. Cl.
| | |
|---|---|
| *H02J 7/00* | (2006.01) |
| *H02J 7/14* | (2006.01) |
| *B60L 53/10* | (2019.01) |
| *B60L 53/34* | (2019.01) |
| *B60L 53/62* | (2019.01) |

(52) U.S. Cl.
CPC .............. *B60L 53/11* (2019.02); *B60L 53/34* (2019.02); *B60L 53/62* (2019.02)

(58) Field of Classification Search
USPC ........................................................ 320/134
See application file for complete search history.

(56) References Cited

U.S. PATENT DOCUMENTS

| | | | | |
|---|---|---|---|---|
| 2011/0022256 | A1* | 1/2011 | Asada | G08C 17/02 701/22 |
| 2012/0041613 | A1* | 2/2012 | Narel | B60L 58/40 700/297 |
| 2012/0062172 | A1* | 3/2012 | Takada | H01M 10/44 320/108 |
| 2015/0188739 | A1* | 7/2015 | Igarashi | H04B 3/46 701/22 |

(Continued)

FOREIGN PATENT DOCUMENTS

| | | |
|---|---|---|
| JP | 2015-039267 A | 2/2015 |
| JP | 2017-046490 A | 3/2017 |

(Continued)

*Primary Examiner* — Alexis B Pacheco
(74) *Attorney, Agent, or Firm* — Dinsmore & Shohl LLP

(57) ABSTRACT

A notification controller controls a notification apparatus that gives a notification to a user of a mobile body. The notification controller controls the notification apparatus to carry out at least one of first notification to control the notification apparatus to give a notification about start of external charging, second notification to control the notification apparatus to give a notification about end of external charging, third notification to control the notification apparatus to give a notification about start of external power feed, and fourth notification to control the notification apparatus to give a notification about end of external power feed. The notification controller can carry out suppression control to restrict a frequency of notification by the notification apparatus by suppressing notification by the notification apparatus.

13 Claims, 12 Drawing Sheets

(56) References Cited

U.S. PATENT DOCUMENTS

| | | |
|---|---|---|
| 2016/0207409 A1 | 7/2016 | Ueo |
| 2017/0305287 A1 | 10/2017 | Affret et al. |
| 2018/0264961 A1* | 9/2018 | Nakagawa ............ B60L 53/305 |
| 2019/0369625 A1* | 12/2019 | Chen ....................... B60L 53/67 |

FOREIGN PATENT DOCUMENTS

| | | |
|---|---|---|
| JP | 2017-077129 A | 4/2017 |
| WO | 2011/075544 A1 | 6/2011 |
| WO | 2016/050410 A1 | 4/2016 |

\* cited by examiner

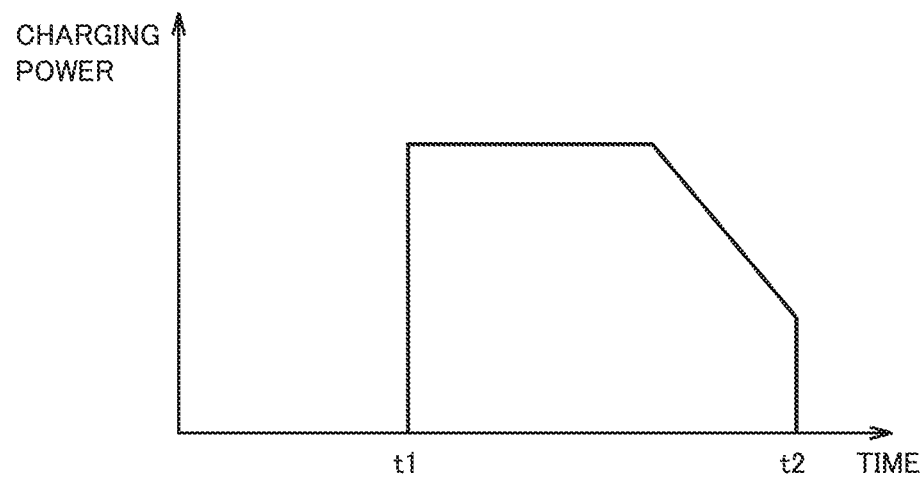
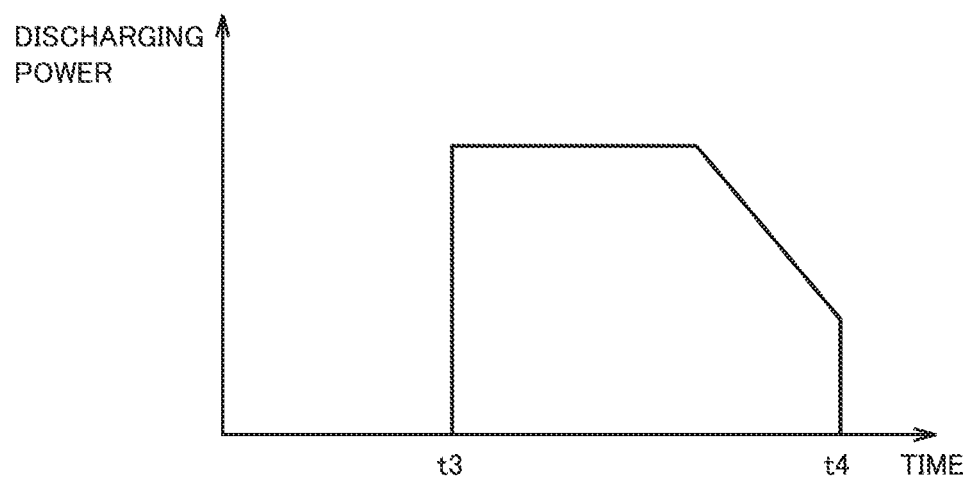
FIG.5

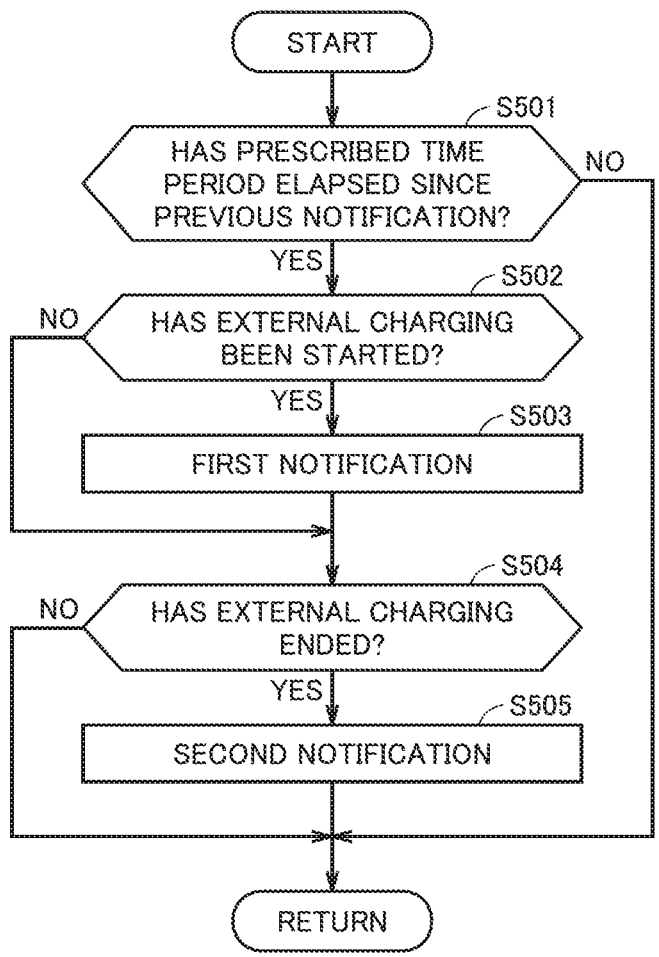

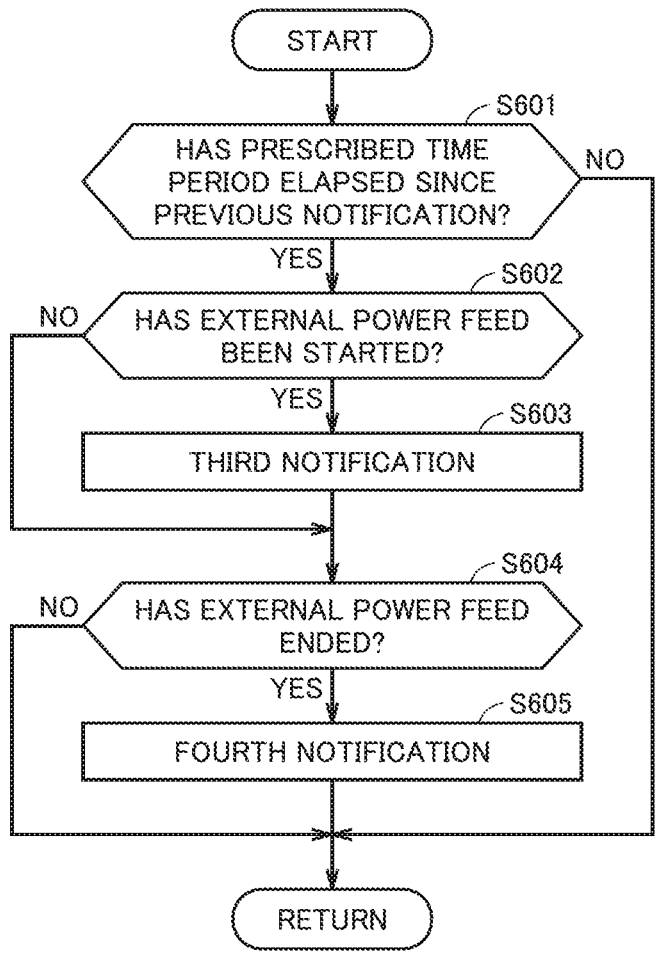

NOTIFICATION CONTROLLER, MOBILE BODY, ELECTRIC POWER SYSTEM, AND NOTIFICATION METHOD

CROSS REFERENCE TO RELATED APPLICATIONS

This nonprovisional application claims priority to Japanese Patent Application No. 2019-197054 filed with the Japan Patent Office on Oct. 30, 2019, the entire contents of which are hereby incorporated by reference.

BACKGROUND

Field

The present disclosure relates to a notification controller, a mobile body, an electric power system, and a notification method.

Description of the Background Art

Japanese Patent Laying-Open No. 2015-039267 discloses a notification controller that notifies a user of abnormal connection when connection between an inlet of a vehicle and a connector of a charging cable is in a half-fitted state. When the notification controller senses the half-fitted state of connection between the inlet of the vehicle and the connector of the charging cable, the notification controller starts up an indicator to notify a user of abnormal connection through the started-up indicator.

Though Japanese Patent Laying-Open No. 2015-039267 discloses an externally chargeable vehicle, another mobile body (a mobile robot or a drone) can also carry out external charging. External charging refers to charging of a power storage mounted on a mobile body with electric power supplied from the outside of the mobile body.

SUMMARY

Though the notification controller described in Japanese Patent Laying-Open No. 2015-039267 notifies a user of occurrence of abnormal connection, it does not notify the user of normal start nor normal end of external charging. Therefore, a situation that, in spite of recognition by the user of normal start (or end) of external charging, external charging was actually not started (or did not end) may occur.

In order to improve convenience of a user, the user may be notified of at least one of normal start and normal end of external charging. In an externally power feedable vehicle, the user may be notified of at least one of normal start and normal end of external power feed. External power feed refers to feed of electric power stored in a power storage included in a mobile body to the outside of the mobile body.

When a frequency of notification is excessively high, however, convenience of the user may be impaired to the contrary. For example, in an electric power system including a power network, a plurality of electric power facilities that exchange electric power with the power network, a plurality of mobile bodies that can electrically be connected to the electric power facilities, and a server that remotely controls the mobile bodies, external charging or external power feed by the mobile body may be carried out in response to a command from the server. The server may request each vehicle to intermittently carry out external charging or external power feed for power leveling. When external charging is intermittently carried out, start and end of external charging is repeated. Therefore, when a notification is given to the user each time external charging is started and/or ends, the user may feel bothered by the notification. When external power feed is intermittently carried out, start and end of external power feed is repeated. Therefore, when a notification is given to the user each time external power feed is started and/or ends, the user may feel bothered by the notification.

The present disclosure was made to solve the problems above, and an object thereof is to improve convenience of a user by appropriately notifying a user of at least one of start and end of external charging and/or external power feed by a mobile body.

A notification controller according to a first point of view of the present disclosure controls a notification apparatus that gives a notification to a user of a mobile body including a power storage. The notification controller controls the notification apparatus to carry out at least one of first notification, second notification, third notification, and fourth notification which will be described below and to carry out suppression control which will be described below.

The first notification refers to processing for notifying, when external charging is started, the user of start of the external charging, the external charging being charging of the power storage with electric power supplied from outside of the mobile body. The second notification refers to processing for notifying, when the external charging ends, the user of end of the external charging, the external charging being charging of the power storage with electric power supplied from outside of the mobile body. The third notification refers to processing for notifying, when external power feed is started, the user of start of the external power feed, the external power feed being feed of electric power stored in the power storage to outside of the mobile body. The fourth notification refers to processing for notifying, when the external power feed ends, the user of end of the external power feed, the external power feed being feed of electric power stored in the power storage to outside of the mobile body. Suppression control refers to control for restricting a frequency of notification by the notification apparatus by suppressing notification by the notification apparatus.

The notification controller can carry out suppression control for restricting notification by the notification apparatus. Therefore, the notification controller can suppress an excessively high frequency of notification by the notification apparatus. According to the notification controller, convenience of a user can be improved by appropriately notifying the user of at least one of start and end of external charging and/or external power feed by the mobile body through at least one of the first notification to the fourth notification while restricting the frequency of notification by the notification apparatus under the suppression control.

The notification controller may carry out at least one of the first notification and the second notification. The suppression control may be control in which, after the notification apparatus carries out any of the first notification and the second notification, the first notification and the second notification are prohibited until a prescribed first period elapses.

According to the notification controller, when the first notification (that is, notification to notify the user of start of external charging) or the second notification (that is, notification to notify the user of end of external charging) is carried out, the first notification and the second notification are prohibited until the first period elapses. Therefore, even though external charging is repeatedly carried out, an excessively high frequency of notification can be suppressed.

The notification controller may carry out at least one of the third notification and the fourth notification. The suppression control may be control in which, after the notification apparatus carries out any of the third notification and the fourth notification, the third notification and the fourth notification are prohibited until a prescribed second period elapses.

According to the notification controller, when the third notification (that is, notification to notify the user of start of external power feed) or the fourth notification (that is, notification to notify the user of end of external power feed) is carried out, the third notification and the fourth notification are prohibited until the second period elapses. Therefore, even though external power feed is repeatedly carried out, an excessively high frequency of notification can be suppressed.

Prohibition of prescribed notification (for example, any of the first notification to the fourth notification) means setting a state in which no notification is given. When the notification controller is unable to carry out the first notification, the first notification is not carried out. When the notification controller is unable to carry out the second notification to the fourth notification, the second notification to the fourth notification are not carried out. Therefore, inability of the notification controller to carry out the first notification, the second notification, the third notification, and the fourth notification means that the first notification, the second notification, the third notification, and the fourth notification are prohibited, respectively. For example, according to the notification controller that is able to carry out only the first notification of the first notification and the second notification, the first notification and the second notification are prohibited by not allowing the first notification. According to the notification controller that is able to carry out only the third notification of the third notification and the fourth notification, the third notification and the fourth notification are prohibited by not allowing the third notification.

The notification controller may carry out at least one of the first notification and the second notification. The suppression control may be control in which, when external charging is carried out in response to a command from a server provided outside the mobile body, at least one of the first notification and the second notification is suppressed.

A server provided outside the mobile body is also referred to as an "external server." According to the configuration, when external charging is carried out in response to a command from the external server, at least one of the first notification and the second notification is suppressed. Therefore, even though external charging is repeatedly carried out in response to the command from the external server, an excessively high frequency of notification can be suppressed.

The suppression control may be control in which, when the mobile body permits external charging based on a command from the external server, at least one of the first notification and the second notification is suppressed. Suppression of notification may be, for example, notification not being carried out for external charging for the second time or later when external charging is intermittently carried out. The suppression control may be control in which switching between execution and cancellation of suppression of notification is made depending on whether or not the mobile body permits external charging based on the command from the external server.

The suppression control may be control in which, when external charging is carried out in response to the command from the server provided outside the mobile body, the first notification and the second notification are prohibited.

According to the configuration, when external charging is carried out in response to the command from the external server, the first notification and the second notification are prohibited. Therefore, when external charging is repeatedly carried out in response to the command from the external server, notification repeated to such an extent as making the user feel bothered can be suppressed.

The notification controller may carry out at least one of the third notification and the fourth notification. The suppression control may be control in which, when external power feed is carried out in response to a command from a server provided outside the mobile body, at least one of the third notification and the fourth notification is suppressed.

According to the configuration, when external power feed is carried out in response to the command from the external server, at least one of the third notification and the fourth notification is suppressed. Therefore, when external power feed is repeatedly carried out in response to the command from the external server, an excessively high frequency of notification can be suppressed.

The suppression control may be control in which, when the mobile body permits external power feed based on a command from the external server, at least one of the third notification and the fourth notification is suppressed. Suppression of notification may be, for example, notification not being carried out for external power feed for the second time or later when external power feed is intermittently carried out. The suppression control may be control in which switching between execution and cancellation of suppression of notification is made depending on whether or not the mobile body permits external power feed based on the command from the external server.

The suppression control may be control in which, when external power feed is carried out in response to the command from the server provided outside the mobile body, the third notification and the fourth notification are prohibited.

According to the configuration, when external power feed is carried out in response to the command from the external server, the third notification and the fourth notification are prohibited. Therefore, when external power feed is repeatedly carried out in response to the command from the external server, notification repeated to such an extent as making the user feel bothered can be suppressed.

The command from the external server may be based on information on supply and demand of a power grid. According to such a configuration, as the external server transmits a command to the mobile body based on information on supply and demand of the power grid, balance between supply and demand of electric power can be regulated.

A command from the external server to the mobile body may directly be sent from the external server to the mobile body or may be sent from the external server through another apparatus (for example, an electric power facility such as EVSE) to the mobile body.

A mobile body according to a second point of view of the present disclosure includes any notification controller described above.

Since the mobile body includes any notification controller described above, convenience of a user can be improved by appropriately notifying the user of at least one of start and end of external charging and/or external power feed by the mobile body.

The mobile body may be a vehicle configured as below and the notification controller may carry out at least one of the first notification and the second notification.

The vehicle includes the power storage that stores electric power for traveling, the notification apparatus controlled by the notification controller, an inlet that receives electric power supplied from outside of the vehicle, a charging apparatus, a vehicle controller that carries out the external charging by controlling the charging apparatus, and a communication apparatus that establishes wireless communication with outside of the vehicle. The charging apparatus carries out first power conversion onto electric power received at the inlet and supplies electric power resulting from first power conversion to the power storage.

The vehicle can carry out external charging. The vehicle can establish wireless communication with the external server. The vehicle can contribute to regulation of power demand by carrying out external charging in response to a request from the external server.

In the vehicle, the notification controller may carry out at least one of the third notification and the fourth notification. The vehicle may further include a power feed apparatus that carries out second power conversion onto electric power discharged from the power storage and supplies electric power resulting from second power conversion to the inlet. The inlet may provide electric power supplied from the power feed apparatus to outside of the vehicle. The vehicle controller may carry out external power feed by controlling the power feed apparatus.

The vehicle can carry out external power feed. The vehicle can contribute to regulation of power demand by carrying out external power feed in response to a request from the external server.

Each of first power conversion and second power conversion may include at least one of AC/DC conversion (conversion from alternating-current (AC) power to direct-current (DC) power), DC/AC conversion (conversion from DC power to AC power), down-conversion, up-conversion, power factor correction, and filtering processing.

An electric power system according to a third point of view of the present disclosure includes any notification controller described above, the mobile body including the power storage, the notification apparatus that is controlled by the notification controller and gives a notification to a user of the mobile body, a plurality of electric power facilities electrically connectable to the mobile body, a power grid that supplies electric power to each of the plurality of electric power facilities, and a server that issues at least one of a first request and a second request. The first request is a request for the mobile body to increase demand of electric power supplied by the power grid. The second request is a request for the mobile body to carry out backfeeding to the power grid.

According to the electric power system, balance between supply and demand of electric power can be regulated by issuance of the first request or the second request from the server to the mobile body. Furthermore, according to the electric power system, convenience of a user can be improved by appropriately notifying, by the notification controller, the user of at least one of start and end of external charging and/or external power feed by the mobile body through at least one of the first notification to the fourth notification while restricting a frequency of notification by the notification apparatus under suppression control.

A notification method according to a fourth point of view of the present disclosure is a method performed by a notification apparatus that gives a notification to a user of a mobile body including a power storage, of giving a notification about at least one of start of charging of the power storage, end of charging of the power storage, start of discharging of the power storage, and end of discharging of the power storage. The notification method includes determining, by a notification controller, whether or not the mobile body permits remote control by a server provided outside the mobile body and restricting, by the notification controller, the notification by the notification apparatus when the notification controller determines that the mobile body permits the remote control.

According to the notification method, when the mobile body permits remote control by the external server, notification (that is, at least one of start of charging of the power storage, end of charging of the power storage, start of discharging of the power storage, and end of discharging of the power storage) by the notification apparatus is restricted. Therefore, even though external charging or external power feed is repeatedly carried out in response to a command from the external server, an excessively high frequency of notification can be suppressed.

The mobile body may be an electrically powered vehicle. The electrically powered vehicle refers to a vehicle that travels with electric power stored in a power storage mounted on the vehicle. The mobile body may remotely be controllable or may be self-driving. The mobile body may be transportation means other than a vehicle or may be an unmanned mobile body.

The notification apparatus may be mounted on a mobile body or carried by a user (for example, a driver, a passenger, or a manager) of the mobile body. The notification apparatus may be mounted on a portable terminal (that is, an electronic device that can be carried by a user).

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 4 is a diagram showing exemplary transition of charging power of a power storage in one external charging.

FIG. 5 is a diagram showing exemplary transition of discharging power of the power storage in one external power feed.

FIG. 16 is a flowchart showing a modification of first notification control and second notification control shown in FIGS. 11 and 12.

FIG. 17 is a flowchart showing a modification of third notification control and fourth notification control shown in FIGS. 13 and 14.

DETAILED DESCRIPTION

Figure 1:
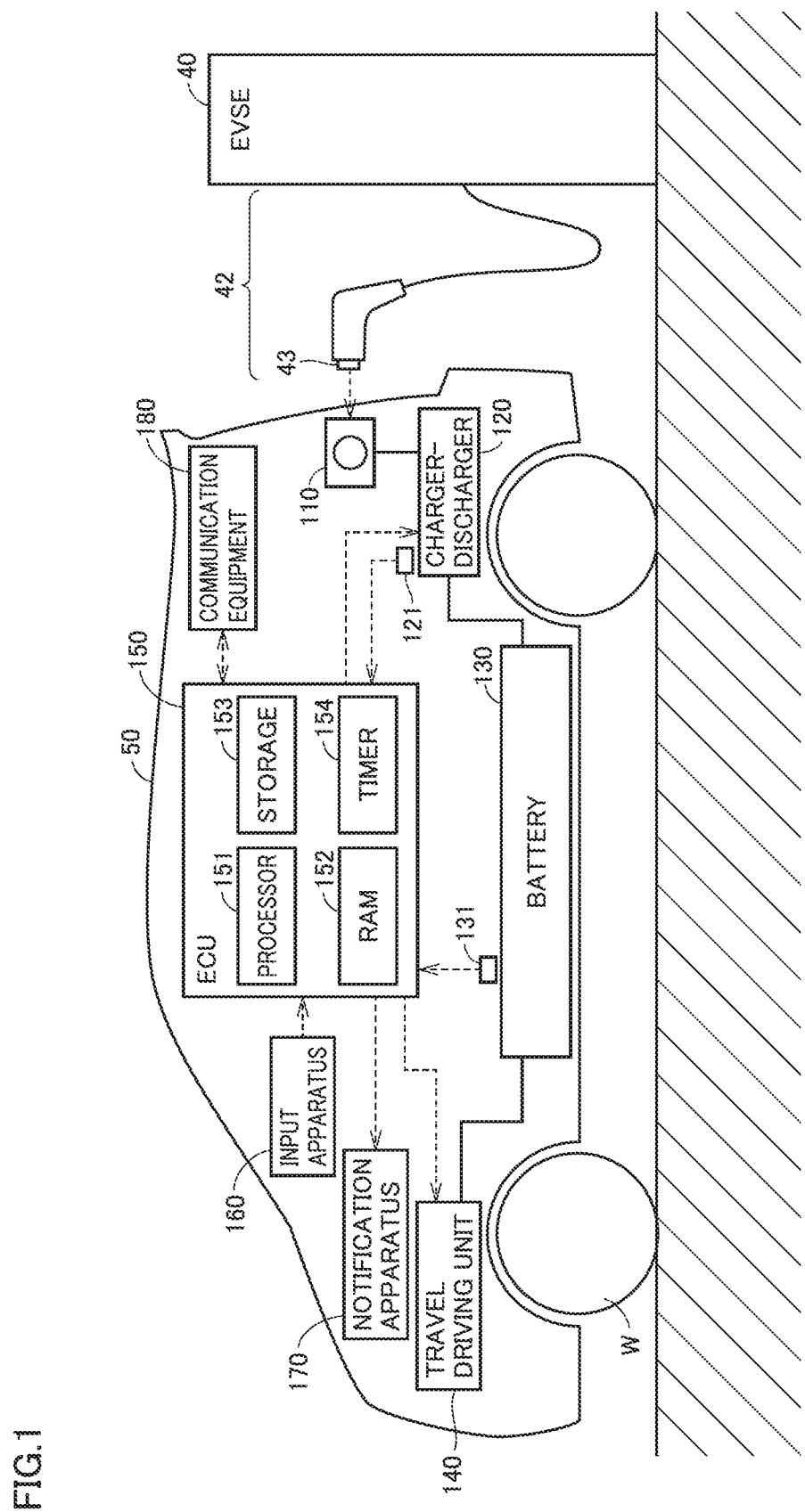
FIG. 1 is a diagram showing a configuration of a vehicle according to an embodiment of the present disclosure.

An embodiment of the present disclosure will be described below in detail with reference to the drawings. The same or corresponding elements in the drawings have the same reference characters allotted and description thereof will not be repeated.

An electric power system according to this embodiment includes a plurality of vehicles. Though the plurality of vehicles in the electric power system may be different from one another in configuration, they are identical in configuration in this embodiment. Each of a plurality of vehicles included in the electric power system is denoted as a "vehicle 50" below and each of a plurality of charging facilities included in the electric power system is denoted as "EVSE 40" below, unless they are described as being distinguished from one another. EVSE means electric vehicle supply equipment. Vehicle 50 according to this embodiment corresponds to an exemplary "mobile body" according to the present disclosure.

FIG. 1 is a diagram showing a configuration of a vehicle according to this embodiment. Referring to FIG. 1, vehicle 50 includes a battery 130 that stores electric power for traveling. Battery 130 includes a secondary battery such as a lithium ion battery or a nickel metal hydride battery. In this embodiment, a battery assembly including a plurality of lithium ion batteries is adopted as the secondary battery. The battery assembly is composed of a plurality of cells electrically connected to one another. Instead of the secondary battery, another power storage such as an electric double layer capacitor may be adopted. Battery 130 according to this embodiment corresponds to an exemplary "power storage" according to the present disclosure.

Vehicle 50 includes an electronic control unit (which is referred to as an "ECU" below) 150. ECU 150 carries out charging control and discharging control of battery 130. ECU 150 controls communication with the outside of vehicle 50. Vehicle 50 further includes a monitoring module 131 that monitors a state of battery 130. Monitoring module 131 includes various sensors that detect a state (for example, a voltage, a current, and a temperature) of battery 130 and outputs a result of detection to ECU 150. ECU 150 can obtain a state (for example, a temperature, a current, a voltage, a state of charge (SOC), and an internal resistance) of battery 130 based on an output (that is, detection values from various sensors) from monitoring module 131. Vehicle 50 may be an electric vehicle (EV) that can travel only with electric power stored in battery 130 or a plug-in hybrid vehicle (PHV) that can travel with both of electric power stored in battery 130 and output from an engine (not shown). Vehicle 50 may be self-driving.

Vehicle 50 can carry out charging of battery 130 by receiving supply of electric power from EVSE 40. Vehicle 50 includes an inlet 110 and a charger-discharger 120 adapted to a power feed type of EVSE 40. Inlet 110 receives electric power supplied from the outside of vehicle 50. Inlet 110 outputs electric power supplied from charger-discharger 120 to the outside of vehicle 50. Though FIG. 1 shows only inlet 110 and charger-discharger 120, vehicle 50 may include an inlet and a charger-discharger for each power feed type so as to adapt to a plurality of power feed types (for example, an AC type and a DC type).

A charging cable 42 is connected to EVSE 40. Charging cable 42 may always be connected to EVSE 40 or may be attachable to and removable from EVSE 40. Charging cable 42 includes a connector 43 at its tip end and contains a power line. Connector 43 of charging cable 42 can be connected to inlet 110. As connector 43 of charging cable 42 connected to EVSE 40 is connected to inlet 110 of vehicle 50, EVSE 40 and vehicle 50 are electrically connected to each other. Electric power can thus be supplied from EVSE 40 through charging cable 42 to vehicle 50.

Charger-discharger 120 is located between inlet 110 and battery 130. Charger-discharger 120 includes a relay that switches between connection and disconnection of an electric power path from inlet 110 to battery 130 and a power conversion circuit (neither of which is shown). For example, a bidirectional converter may be adopted as the power conversion circuit. Each of the relay and the power conversion circuit included in charger-discharger 120 is controlled by ECU 150. Vehicle 50 further includes a monitoring module 121 that monitors a state of charger-discharger 120. Monitoring module 121 includes various sensors that detect a state (for example, a voltage, a current, and a temperature) of charger-discharger 120 and outputs a result of detection to ECU 150. In this embodiment, monitoring module 121 detects a voltage and a current input to and output from the power conversion circuit.

As EVSE 40 outside vehicle 50 and inlet 110 are connected to each other through charging cable 42, electric power can be supplied and received between EVSE 40 and vehicle 50. Therefore, external charging by vehicle 50 can be carried out (that is, electric power can be supplied from the outside of vehicle 50 to charge battery 130 of vehicle 50). Electric power for external charging is supplied, for example, from EVSE 40 through charging cable 42 to inlet 110. Charger-discharger 120 converts electric power received at inlet 110 into electric power suitable for charging of battery 130 and supplies resultant electric power to battery 130. Power conversion at this time corresponds to exemplary "first power conversion" according to the present disclosure. As EVSE 40 and inlet 110 are connected to each other through charging cable 42, external power feed by vehicle 50 (that is, power feed from vehicle 50 through charging cable 42 to EVSE 40) can be carried out. Electric power for external power feed is supplied from battery 130 to charger-discharger 120. Charger-discharger 120 converts electric power discharged from battery 130 into electric power suitable for external power feed and supplies resultant electric power to inlet 110. Power conversion at this time corresponds to exemplary "second power conversion" according to the present disclosure. When any of external charging and external power feed is performed, the relay of charger-discharger 120 is closed (connected), and when neither of external charging and external power feed is performed, the relay of charger-discharger 120 is opened (disconnected).

Charger-discharger 120 functions as both of a "charging apparatus" and a "power feed apparatus" according to the present disclosure. When vehicle 50 carries out external power feed to AC type EVSE, charger-discharger 120 may subject electric power discharged from battery 130 to DC/AC conversion and resultant AC power may be supplied from vehicle 50 to the EVSE. When vehicle 50 carries out external power feed to DC type EVSE, vehicle 50 may supply DC power to the EVSE and an inverter contained in the EVSE may carry out DC/AC conversion. Standards of the DC type EVSE may be any of CHAdeMO, Combined Charging System (CCS), GB/T, and Tesla. The configuration of charger-discharger 120 is not limited as above and can be modified as appropriate. Charger-discharger 120 may include, for example, at least one of a rectification circuit, a power factor correction (PFC) circuit, an insulating circuit (for example, an insulating transformer), an inverter, and a filter circuit.

ECU 150 includes a processor 151, a random access memory (RAM) 152, a storage 153, and a timer 154. For example, a central processing unit (CPU) can be adopted as processor 151. RAM 152 functions as a work memory that temporarily stores data to be processed by processor 151. Storage 153 can store information that is put thereinto. Storage 153 includes, for example, a read only memory (ROM) and a rewritable non-volatile memory. Storage 153 stores not only a program but also information (for example, a map, a mathematical expression, and various parameters) to be used by a program. As a program stored in storage 153 is executed by processor 151, various types of control by ECU 150 are carried out in this embodiment. Various types of control by ECU 150 are not limited to control carried out by software but can be carried out also by dedicated hardware (electronic circuitry). Any number of processors may be provided in ECU 150 and a processor may be prepared for each prescribed type of control.

Timer 154 notifies processor 151 that the set time has come. As the time set in timer 154 comes, timer 154 transmits a signal to that effect to processor 151. In this embodiment, a timer circuit is adopted as timer 154. Timer 154 may be implemented by software instead of hardware (timer circuitry).

Vehicle 50 further includes a travel driving unit 140, an input apparatus 160, a notification apparatus 170, communication equipment 180, and a drive wheel W. Vehicle 50 is not limited to a front-wheel-drive vehicle shown in FIG. 1 and it may be a rear-wheel-drive vehicle or a four-wheel-drive vehicle.

Travel driving unit 140 includes a not-shown power control unit (PCU) and a motor generator (MG), and allows vehicle 50 to travel with electric power stored in battery 130. The PCU includes, for example, a controller including a processor, an inverter, a converter, and a relay (which is referred to as a "system main relay (SMR)" below) (none of which is shown). The controller of the PCU receives an instruction (a control signal) from ECU 150 and controls the inverter, the converter, and the SMR of the PCU in accordance with the instruction. The MG is implemented, for example, by a three-phase AC motor generator. The MG is driven by the PCU and rotates drive wheel W. The MG performs regeneration and supplies regenerated electric power to battery 130. The SMR switches between connection and disconnection of an electric power path from battery 130 to the PCU. The SMR is closed (connected) when vehicle 50 travels.

Input apparatus 160 accepts an input from a user. Input apparatus 160 is operated by a user and outputs a signal corresponding to the operation by the user to ECU 150. Communication may be wired or wireless. Examples of input apparatus 160 include various switches, various pointing devices, a keyboard, and a touch panel. An operation portion of a car navigation system may be adopted as input apparatus 160. A smart speaker that accepts audio input may be adopted as input apparatus 160.

Notification apparatus 170 gives a notification to a user (for example, a driver and/or a passenger of vehicle 50) of vehicle 50 when a request is given from ECU 150. Notification apparatus 170 may include at least one of a display apparatus (for example, a touch panel display), a speaker (for example, a smart speaker), and a lamp (for example, a malfunction indicator lamp (MIL)). Notification apparatus 170 may be implemented by a meter panel, a head-up display, or a car navigation system.

Communication equipment 180 includes various communication interfaces (I/F). Communication equipment 180 may include a data communication module (DCM). ECU 150 wirelessly communicates with a communication apparatus outside vehicle 50 through communication equipment 180. Communication equipment 180 according to this embodiment corresponds to an exemplary "communication apparatus" according to the present disclosure.

An electric power system dependent on a large-scale power plant (an intensive energy resource) possessed by an electric power utility company has recently been reviewed and a scheme for utilizing an energy resource possessed by each demand side (which is also referred to as "demand side resources (DSR)" below) has been constructed. The DSR functions as distributed energy resources (which are also referred to as "DER" below).

A virtual power plant (VPP) has been proposed as a scheme for utilizing the DSR for an electric power system. The VPP refers to a scheme in which a large number of DER (for example, DSR) are put together according to a sophisticated energy management technology that makes use of the Internet of Things (IoT) and the DER are remotely controlled as being integrated as if the DER functioned as a single power plant. In the VPP, an electric utility that puts the DER together to provide an energy management service is referred to as an "aggregator." An electric power utility company, for example, in coordination with an aggregator, can balance between supply and demand of electric power based on demand response (which is also referred to as "DR" below).

DR is an approach to balancing between supply and demand of electric power by issuing a prescribed request to each demand side by using a demand response signal (which is also referred to as a "DR signal" below). The DR signal is broadly categorized into two types of a DR signal that requests suppression of power demand or backfeeding (which is also referred to as a "DR suppression signal"

below) and a DR signal that requests increase in power demand (which is also referred to as a "DR increase signal" below).

A vehicle grid integration (VGI) system is adopted as the electric power system according to this embodiment. In the electric power system according to this embodiment, an electrically powered vehicle (that is, vehicle 50 described above) including a power storage is adopted as DSR for realizing VPP.

Figure 2:
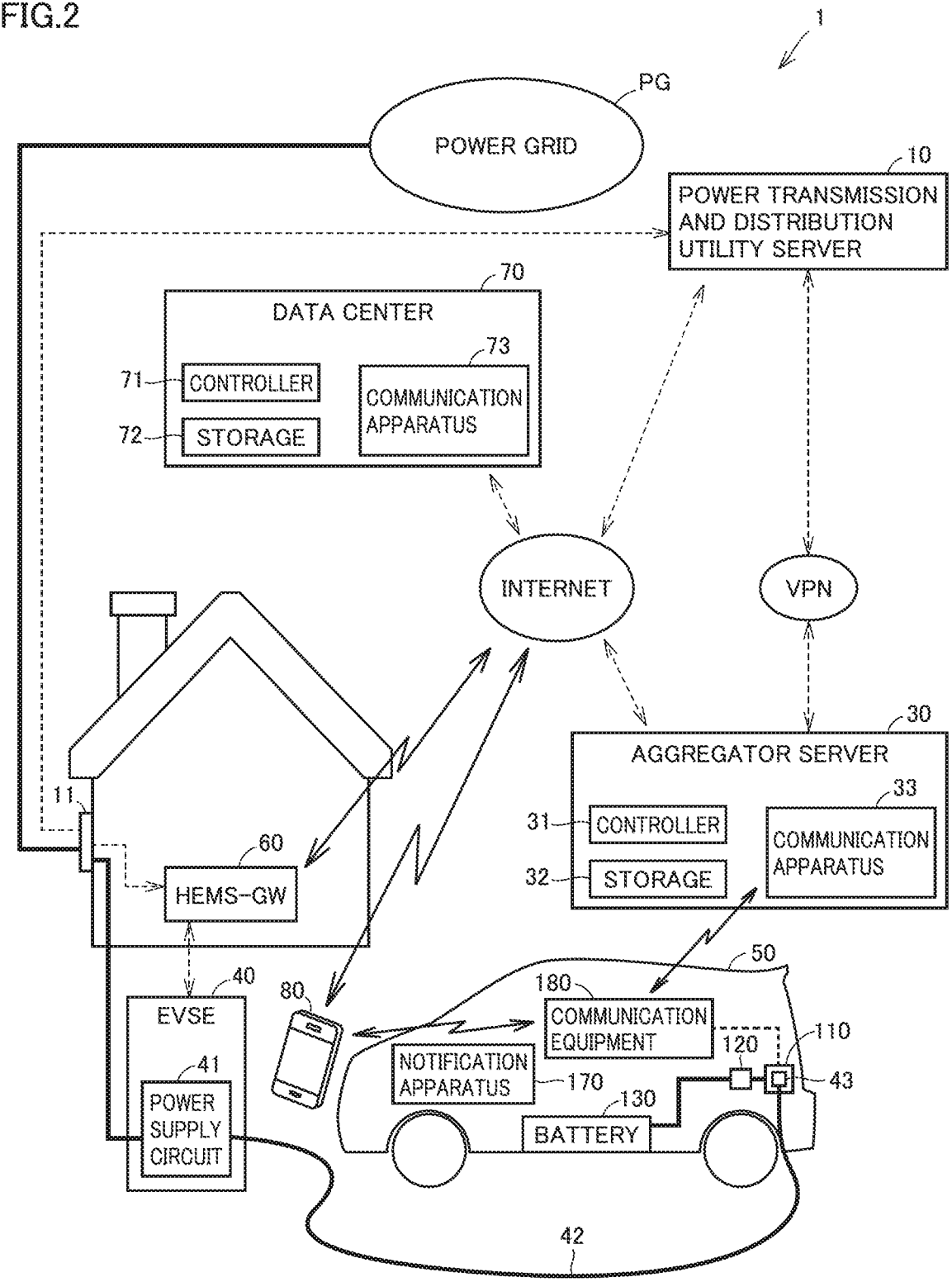
FIG. 2 is a diagram showing a schematic configuration of an electric power system according to the embodiment of the present disclosure.

FIG. 2 is a diagram showing a schematic configuration of the electric power system according to this embodiment. A VGI system 1 shown in FIG. 2 corresponds to an exemplary "electric power system" according to the present disclosure. Though FIG. 2 shows only one of each of the vehicle, the EVSE, and an aggregator server, VGI system 1 includes a plurality of vehicles, a plurality of pieces of EVSE, and a plurality of aggregator servers. Each piece of EVSE included in VGI system 1 corresponds to an exemplary "electric power facility" according to the present disclosure. Any independent number of vehicles, pieces of EVSE, and aggregator servers may be included in VGI system 1, and the number may be set to ten or more or one hundred or more. Each vehicle included in VGI system 1 may be a personally owned vehicle (POV) or a vehicle managed by a mobility as a service (MaaS) entity (MaaS vehicle). Though FIG. 2 shows only a single portable terminal, the portable terminal is carried by each user of the vehicle. Though FIG. 2 illustrates home EVSE, VGI system 1 may include public EVSE that can be used by a large number of unspecified users.

Referring to FIG. 2, VGI system 1 includes a power transmission and distribution utility server 10 (which is also simply referred to as a "server 10" below), a smart meter 11, an aggregator server 30 (which is also simply referred to as a "server 30" below), EVSE 40, vehicle 50 (see FIG. 1), a home energy management system-gateway (HEMS-GW) 60, a data center 70, a portable terminal 80, and a power grid PG. Power grid PG supplies electric power to each piece of EVSE included in VGI system 1. In this embodiment, a smartphone equipped with a touch panel display is adopted as portable terminal 80. Without being limited thereto, any portable terminal can be adopted as portable terminal 80, and a tablet terminal, a wearable device (for example, a smart watch), an electronic key, or a service tool can also be adopted.

Server 10 belongs to a power transmission and distribution utility. In this embodiment, an electric power utility company serves also as a power generation utility and a power transmission and distribution utility. The electric power utility company constructs a power network (that is, power grid PG) with a power plant and a power transmission and distribution facility which are not shown, and maintains and manages server 10, smart meter 11, EVSE 40, HEMS-GW 60, and power grid PG. In this embodiment, the electric power utility company corresponds to a system operator that operates power grid PG.

The electric power utility company can make a profit, for example, by dealing with a demand side (for example, an individual or a company) that uses electric power. The electric power utility company provides each demand side with a smart meter. For example, a user of vehicle 50 shown in FIG. 2 is provided with smart meter 11. Identification information (which is also referred to as a "meter ID" below) for identification of each smart meter is provided for each smart meter, and server 10 manages a value of measurement by each smart meter as being distinguished based on the meter ID. The electric power utility company can know an amount of power usage for each demand side based on a value of measurement by each smart meter.

In VGI system 1, identification information (ID) for identification among a plurality of aggregators is provided for each aggregator. Server 10 manages information for each aggregator as being distinguished based on the ID of the aggregator. The aggregator provides an energy management service by putting together amounts of electric power controlled by demand sides under the control thereof. The aggregator can control the amount of electric power by requesting each demand side to regulate supply and demand by using a DR signal.

Server 30 belongs to an aggregator. Server 30 includes a controller 31, a storage 32, and a communication apparatus 33. Controller 31 includes a processor, performs prescribed information processing, and controls communication apparatus 33. Storage 32 can store various types of information. Communication apparatus 33 includes various communication I/Fs. Controller 31 communicates with the outside through communication apparatus 33. In VGI system 1, an electrically powered vehicle (for example, a POV or a MaaS vehicle) is adopted as DSR managed by the aggregator (and server 30). A demand side can control an amount of electric power by means of the electrically powered vehicle. Identification information for identification of each vehicle 50 included in VGI system 1 (which is also referred to as a "vehicle ID" below) is provided for each vehicle 50. Server 30 manages information for each vehicle 50 as being distinguished based on the vehicle ID. The vehicle ID may be vehicle identification number (VIN). The aggregator may procure capacity (capability of supply of electricity) not only from vehicle 50 but also from a resource other than vehicle 50 (for example, a vending machine, a plant factory, or biomass). The aggregator can make a profit, for example, by dealing with an electric power utility company. The aggregator may be divided into an upper aggregator that contacts a power transmission and distribution utility (for example, the electric power utility company) and a lower aggregator that contacts a demand side.

Data center 70 includes a controller 71, a storage 72, and a communication apparatus 73. Controller 71 includes a processor, performs prescribed information processing, and controls communication apparatus 73. Storage 72 can store various types of information. Communication apparatus 73 includes various types of communication interfaces (I/F). Controller 71 communicates with the outside through communication apparatus 73. Data center 70 manages information on a plurality of registered portable terminals (including portable terminals 80). Information on the portable terminal includes not only information on the terminal itself (for example, a communication address of the portable terminal) but also information on a user who carries the portable terminal (for example, a vehicle ID of vehicle 50 belonging to the user). Identification information for identification of the portable terminal (which is also referred to as a "terminal ID" below) is provided for each portable terminal and data center 70 manages information for each portable terminal as being distinguished based on the terminal ID. The terminal ID also functions as information for identification of a user (a user ID).

Prescribed application software (which is simply referred to as an "application" below) is installed in portable terminal 80, and portable terminal 80 exchanges information with each of HEMS-GW 60 and data center 70 through the application. Portable terminal 80 wirelessly communicates with each of HEMS-GW 60 and data center 70, for example, through the Internet. A user can transmit information representing a state and a schedule of the user to data center 70 by operating portable terminal 80. Exemplary information representing a state of the user includes information indicating whether or not the user is in a condition of being ready for addressing DR. Exemplary information representing the schedule of the user includes time of departure of a POV from home or a drive plan of a MaaS vehicle. Data center 70 stores the information received from portable terminal 80 as being distinguished for each terminal ID.

Server 10 and server 30 can communicate with each other, for example, through a virtual private network (VPN). A protocol of communication between server 10 and server 30 may be OpenADR. Server 30 and data center 70 can communicate with each other, for example, through the Internet. A protocol of communication between server 30 and data center 70 may be OpenADR. Server 30 can obtain information on a user from data center 70. Each of server 30 and data center 70 can communicate with HEMS-GW 60, for example, through the Internet. A protocol of communication between each of server 30 and data center 70 and HEMS-GW 60 may be OpenADR.

Though server 30 and EVSE 40 do not communicate with each other in this embodiment, server 30 and EVSE 40 may communicate with each other. Server 30 may communicate with vehicle 50 with EVSE 40 being interposed. EVSE 40 may communicate with an EVSE management cloud. A protocol of communication between EVSE 40 and the EVSE management cloud may be open charge point protocol (OCPP).

Server 30 sequentially obtains from each vehicle 50, information representing a state or schedule of each vehicle 50 (for example, a position of the vehicle, a state of connection of the charging cable, a state of the battery, a charging schedule, a condition for charging, a schedule of travel, and a condition for travel) under the control thereof and stores the information. The state of connection of the charging cable is information on whether or not connector 43 of charging cable 42 is connected to inlet 110. The state of the battery is information on a value of an SOC of battery 130 and information indicating whether or not battery 130 is being charged. The charging schedule is information indicating time of start and end of scheduled charging. The condition for charging may be a condition for scheduled charging (for example, charging power) or a condition for charging that is currently ongoing (for example, charging power and a remaining time period of charging). The schedule of travel is information indicating time of start and end of scheduled travel. The condition for travel may be a condition for scheduled travel (for example, a travel route and a travel distance) or a condition for travel that is currently ongoing (for example, a traveling speed and a remaining distance of travel).

Server 10 levels electric power by using demand response (DR). When server 10 levels electric power, initially, the server transmits a signal (which is also referred to as a "DR participation request" below) requesting participation into DR to each aggregator server (including server 30). The DR participation request includes a region of interest of DR, a type of DR (for example, DR suppression or DR increase), and a DR period. When server 30 receives a DR participation request from server 10, it calculates an adjustable DR amount (that is, an amount of electric power that can be adjusted in accordance with DR) and transmits the amount to server 10. Server 30 can calculate the adjustable DR amount, for example, based on a total of DR capacities (that is, power adjustment capability) of demand sides under the control thereof.

Server 10 determines a DR amount (that is, an amount of power adjustment asked to an aggregator) for each aggregator based on the adjustable DR amount received from each aggregator server and transmits a signal (which is also referred to as a "DR execution instruction" below) instructing each aggregator server (including server 30) to execute DR. The DR execution instruction includes a region of interest of DR, a type of DR (for example, DR suppression or DR increase), a DR amount for the aggregator, and a DR period. When server 30 receives the DR execution instruction, it allocates the DR amount to each vehicle 50 that can address DR among vehicles 50 under the control thereof, generates a DR signal for each vehicle 50, and transmits the DR signal to each vehicle 50. The DR signal may be a price signal that urges a user of vehicle 50 to regulate supply and demand or a charging command or a power feed command for server 30 to directly control vehicle 50. The price signal may include a type of DR (for example, DR suppression or DR increase), a DR amount for vehicle 50, a DR period, and incentive information. When vehicle 50 permits remote control (for example, dispatching by server 30), server 30 can directly control vehicle 50 by transmitting a charging command or a power feed command to vehicle 50.

ECU 150 receives a DR signal through communication equipment 180 from the outside of the vehicle. When ECU 150 receives the DR signal, a user of vehicle 50 can contribute to regulation of supply and demand of power grid PG by carrying out charging or discharging in accordance with the DR signal by using EVSE 40 and vehicle 50. When the user of vehicle 50 has contributed to regulation of supply and demand of power grid PG, an incentive in accordance with contribution may be paid to the user of vehicle 50 by an electric utility (for example, an electric power utility company or an aggregator) based on an agreement between the user of vehicle 50 and the electric utility.

An electric utility measures contribution with any method. The electric utility may find a contribution based on a measurement value from smart meter 11. VGI system 1 may include, in addition to smart meter 11, a wattmeter (for example, another smart meter) that measures a contribution. The electric utility may find a contribution based on a measurement value from a wattmeter (not shown) contained in EVSE 40. The electric utility may find a contribution based on a measurement value from a sensor (for example, monitoring module 121 or 131) mounted on vehicle 50. A portable charging cable may be provided with a metering function and the electric utility may find a contribution based on an amount of electric power measured by the charging cable. A user ID may be provided for each charging cable and the user ID may automatically be transmitted from the charging cable to a server (for example, server 10 or 30) of the electric utility when the user uses the charging cable. By doing so, the electric utility can identify which user has carried out charging and discharging.

Vehicle 50 shown in FIG. 2 is electrically connected to outdoor EVSE 40 through charging cable 42 while it is parked in a parking space of a residence (for example, a user's house). EVSE 40 is a non-public charging facility used only by a user and a family member of the user. As connector 43 of charging cable 42 connected to EVSE 40 is connected to inlet 110 of vehicle 50, vehicle 50 and EVSE 40 can communicate with each other and electric power can be supplied from a power supply circuit 41 included in EVSE 40 to vehicle 50 (and battery 130). Power supply circuit 41 converts electric power supplied from power grid PG into electric power suitable for external charging and outputs resultant electric power to charging cable 42.

Power supply circuit 41 is connected to power grid PG provided by the electric power utility company with smart meter 11 being interposed. Smart meter 11 measures an amount of electric power supplied from EVSE 40 to vehicle 50. Smart meter 11 measures an amount of power usage each time a prescribed time period elapses (for example, each time thirty minutes elapse), stores the measured amount of power usage, and transmits the measured amount of power usage to server 10 and HEMS-GW 60. For example, IEC (DLMS/COSEM) can be adopted as a protocol for communication between smart meter 11 and server 10. Server 10 transmits at any time, a value of measurement by smart meter 11 to server 30. Server 10 may transmit the measurement value regularly or upon request from server 30. In this embodiment, EVSE 40 is a charging facility adapted to backfeeding (that is, a charging and discharging facility). Electric power backfed from vehicle 50 to EVSE 40 is supplied from EVSE 40 to power grid PG. Smart meter 11 may measure an amount of electric power backfed from vehicle 50 to EVSE 40.

HEMS-GW 60 transmits information on energy management (for example, information representing a state of use of electric power) to each of server 30, data center 70, and portable terminal 80. HEMS-GW 60 receives a value of measurement of the amount of electric power from smart meter 11. Smart meter 11 and HEMS-GW 60 may communicate with each other in any type of communication, and the type of communication may be a 920-MHz-band low-power wireless communication or power line communication (PLC). HEMS-GW 60 and EVSE 40 can communicate with each other, for example, through a local area network (LAN). The LAN may be wired or wireless LAN. Standards of communication between HEMS-GW 60 and EVSE 40 may be any of ECHONET Lite, smart energy profile (SEP) 2.0, and KNX.

Communication equipment 180 mounted on vehicle 50 communicates with EVSE 40 through charging cable 42. Communication between EVSE 40 and vehicle 50 may be of any type, and for example, controller area network (CAN) or PLC may be adopted. Standards of communication between EVSE 40 and vehicle 50 may be ISO/IEC15118 or IEC61851.

In this embodiment, a control pilot (CPLT) signal is exchanged between vehicle 50 and EVSE 40 through a signal line accommodated in charging cable 42. The CPLT signal is in conformity with "SAE Electric Vehicle Conductive Charge Coupler" standards (SAE J1772). EVSE 40 can give vehicle 50 information on power transmission (for example, a state of connection of charging cable 42 and a capacity of a current through charging cable 42) by using the CPLT signal. Vehicle 50 can also give EVSE 40 information on power transmission (for example, whether or not the vehicle is in an externally chargeable state or in an externally power-feedable state) by using the CPLT signal.

Communication equipment 180 wirelessly communicates with server 30, for example, through a mobile communication network (telematics). A signal exchanged between vehicle 50 and server 30 may be encrypted by a scheme designated by an aggregator. In this embodiment, communication equipment 180 and portable terminal 80 wirelessly communicate with each other. ECU 150 (FIG. 1) can control portable terminal 80 through wireless communication to give a notification to a user. Communication equipment 180 and portable terminal 80 may communicate with each other through short-range communication such as Bluetooth® (for example, direct communication in a vehicle or within an area around the vehicle).

Figure 3:
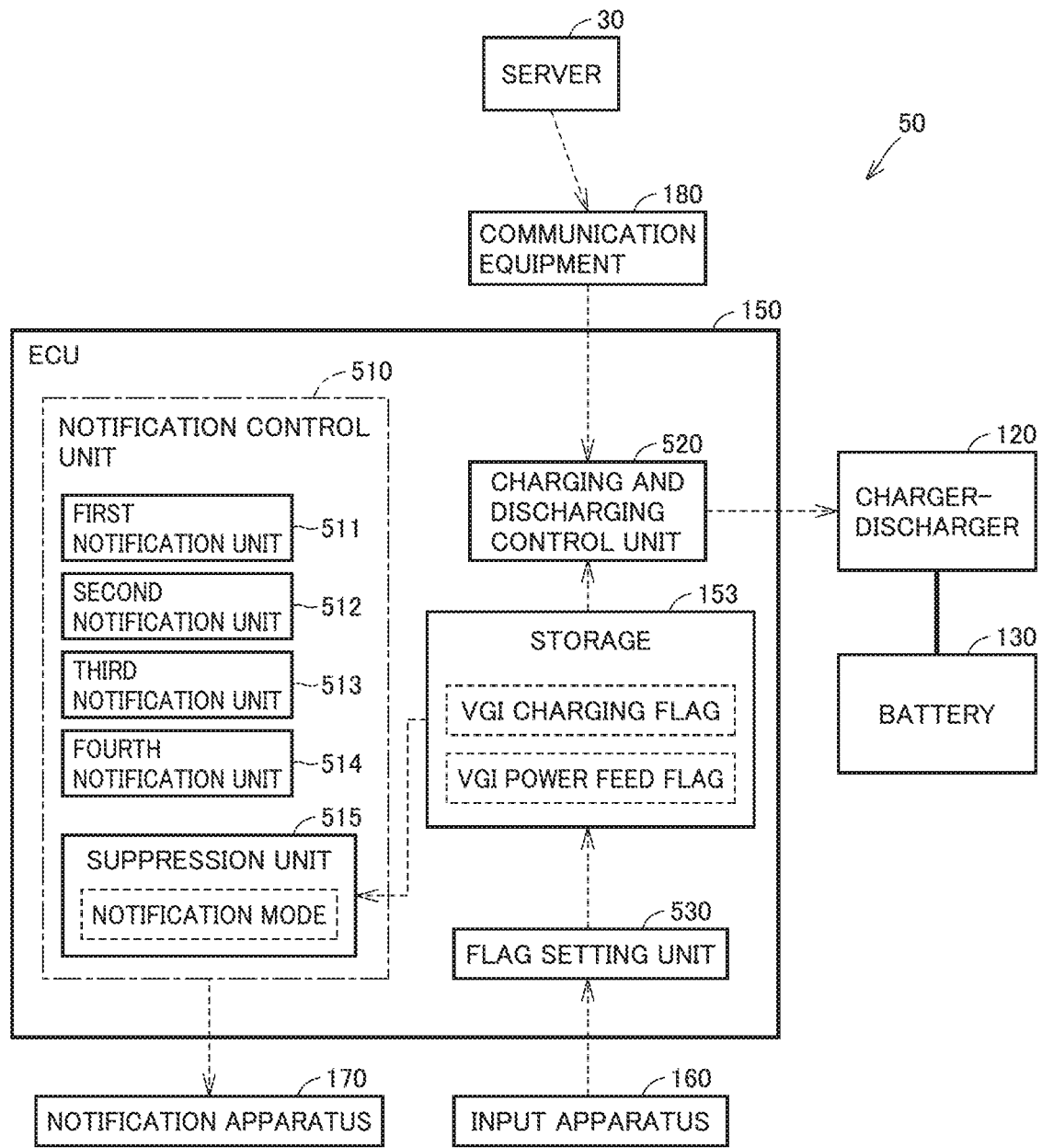
FIG. 3 is a diagram showing, for each function, a component of a notification controller included in the electric power system according to the embodiment of the present disclosure.

FIG. 3 is a diagram showing a component of ECU 150 for each function. Referring to FIG. 3, ECU 150 includes a notification control unit 510, a charging and discharging control unit 520, and a flag setting unit 530 which will be described below. Notification control unit 510 includes a first notification unit 511, a second notification unit 512, a third notification unit 513, a fourth notification unit 514, and a suppression unit 515. In ECU 150 according to this embodiment, each component above is implemented by processor 151 shown in FIG. 1 and a program executed by processor 151. Without being limited as such, each component may be implemented by dedicated hardware (electronic circuitry). ECU 150 according to this embodiment corresponds to an exemplary "notification controller" according to the present disclosure.

First notification unit 511 controls notification apparatus 170 to carry out first notification when external charging is started. First notification is processing for notifying a user of start of external charging. Second notification unit 512 controls notification apparatus 170 to carry out second notification when external charging ends. Second notification is processing for notifying a user of end of external charging.

FIG. 4 is a diagram showing exemplary transition of charging power of battery 130 in one external charging. Referring to FIG. 4, in this example, external charging is started at timing t1 and started external charging ends at timing t2. First notification unit 511 controls notification apparatus 170 to carry out first notification at timing t1. First notification may be processing for giving a user such a message as "charging is started" by representation and/or voice. Second notification unit 512 controls notification apparatus 170 to carry out second notification at timing t2. Second notification may be processing for giving a user such a message as "charging has ended" by representation and/or voice. First notification unit 511 and second notification unit 512 may control portable terminal 80 to carry out first notification and second notification, instead of or in addition to notification apparatus 170.

Referring again to FIG. 3, third notification unit 513 controls notification apparatus 170 to carry out third notification when external power feed is started. Third notification is processing for notifying a user of start of external power feed. Fourth notification unit 514 controls notification apparatus 170 to carry out fourth notification when external power feed ends. Fourth notification is processing for notifying a user of end of external power feed.

FIG. 5 is a diagram showing exemplary transition of discharging power of battery 130 in one external power feed. Referring to FIG. 5, in this example, external power feed is started at timing t3 and started external power feed ends at timing t4. Third notification unit 513 controls notification apparatus 170 to carry out third notification at timing t3. Third notification may be processing for giving a user such a message as "power feed is started" by representation and/or voice. Fourth notification unit 514 controls notification apparatus 170 to carry out fourth notification at timing t4. Fourth notification may be processing for giving a user such a message as "power feed has ended" by representation and/or voice. Third notification unit 513 and fourth notification unit 514 may control portable terminal 80 to carry out third notification and fourth notification, instead of or in addition to notification apparatus 170.

Referring again to FIG. 3, suppression unit 515 restricts a frequency of notification by a prescribed notification apparatus by suppressing notification by the prescribed notification apparatus. In this embodiment, notification apparatus 170 is adopted as the prescribed notification apparatus. Details of suppression unit 515 will be described later.

Charging and discharging control unit 520 carries out external charging and external power feed by controlling charger-discharger 120. ECU 150 functions as a "vehicle controller" according to the present disclosure by including charging and discharging control unit 520. In this embodiment, a VGI charging flag and a VGI power feed flag are stored in storage 153. When the VGI charging flag is ON, charging and discharging control unit 520 is permitted to carry out external charging under remote charging control. Remote charging control refers to control of charger-discharger 120 by charging and discharging control unit 520 in response to a prescribed charging command received from the outside of vehicle 50 through communication equipment 180. The charging command according to this embodiment corresponds to an exemplary "first request" according to the present disclosure. When the VGI charging flag is OFF, remote charging control by charging and discharging control unit 520 is prohibited. When the VGI power feed flag is ON, charging and discharging control unit 520 is permitted to carry out external power feed (and backfeeding) under remote power feed control. Remote power feed control refers to control of charger-discharger 120 by charging and discharging control unit 520 in accordance with a prescribed power feed instruction received from the outside of vehicle 50 through communication equipment 180. A feed power command according to this embodiment corresponds to an exemplary "second request" according to the present disclosure. When the VGI power feed flag is OFF, remote power feed control by charging and discharging control unit 520 is prohibited. Though details will be described later, remote charging control and remote power feed control are carried out in accordance with an instruction from server 30 in this embodiment (see FIG. 6 which will be described later). Values of the VGI charging flag and the VGI power feed flag will be referred to as a "flag value" unless they are described as being distinguished from each other.

Flag setting unit 530 accepts an input of a flag value (ON/OFF) from a user and sets the flag value input from the user into the VGI charging flag and the VGI power feed flag. The user can input a flag value (ON/OFF) to flag setting unit 530 through input apparatus 160.

Figure 6:
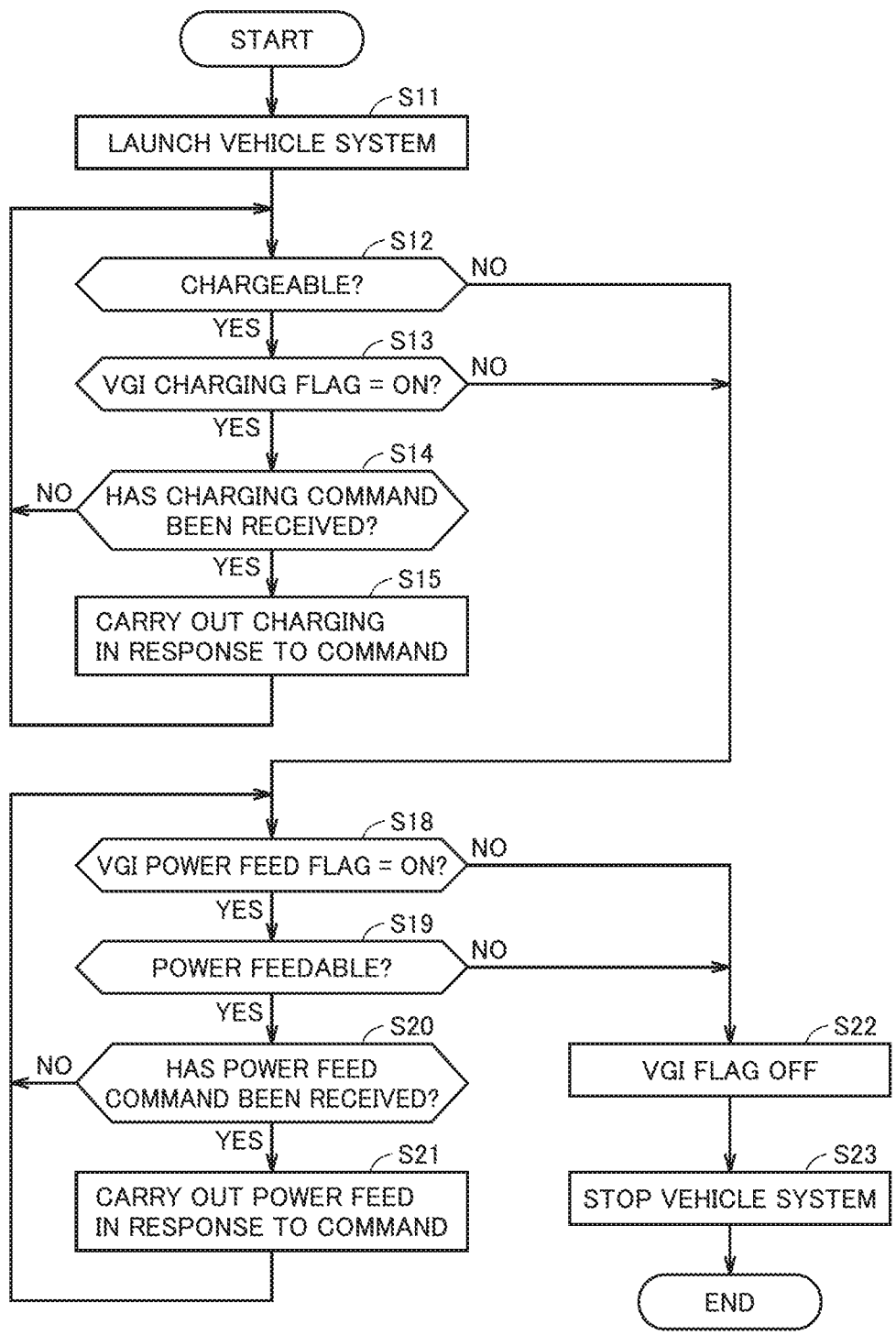
FIG. 6 is a flowchart showing control of charging and discharging of the power storage carried out when preparation for charging and discharging is completed (for example, when a cable is connected) in the embodiment of the present disclosure.

FIG. 6 is a flowchart showing control of charging and discharging of battery 130 carried out when preparation for charging and discharging is completed (for example, when a cable is connected). Processing shown in this flowchart is started when preparation for external charging and external power feed in vehicle 50 is completed.

In vehicle 50 according to this embodiment, when a driver stops the vehicle and applies a parking brake (not shown) to set a shift position to parking (P) while the vehicle system is active and thereafter presses a start-up switch (not shown), the vehicle system (and ECU 150) is set to a stopped state (a Ready-off state) and vehicle 50 is parked. In general, the start-up switch is referred to as a "power switch" or an "ignition switch."

The stopped state includes not only a state in which an operation of the entire system is completely stopped and also a state in a power saving mode. In this embodiment, when the start-up switch is in an OFF state, ECU 150 enters a sleep mode. The sleep mode corresponds to an exemplary "power saving mode." Electric power for activating the vehicle system (including ECU 150) is supplied from an auxiliary battery (not shown) lower in capacity than battery 130. In this embodiment, when connector 43 of charging cable 42 connected to EVSE 40 is connected to inlet 110 of vehicle 50 while vehicle 50 is parked (see FIG. 1), preparation for external charging and external power feed in vehicle 50 is completed and processing in FIG. 6 is started.

Referring to FIG. 6 together with FIG. 3, in a step (which is simply denoted as "S" below) 11, the vehicle system (including ECU 150) is started up. ECU 150 thus returns from the sleep mode.

In S12, charging and discharging control unit 520 (FIG. 3) of ECU 150 determines whether or not vehicle 50 is in an externally chargeable state, based on outputs from various sensors. For example, when an abnormal condition (for example, communication abnormality or circuit abnormality) occurs in at least one of vehicle 50 and EVSE 40, charging and discharging control unit 520 determines that vehicle 50 is not in the externally chargeable state. Charging and discharging control unit 520 checks a state of connection of charging cable 42, and when connection is insufficient as well, charging and discharging control unit 520 determines that vehicle 50 is not in the externally chargeable state. When the SOC of battery 130 is equal to or higher than a prescribed SOC value (for example, a value indicating full charge) as well, charging and discharging control unit 520 determines that vehicle 50 is not in the externally chargeable state.

When vehicle 50 is in the externally chargeable state (YES in S12), in S13, charging and discharging control unit 520 determines whether or not the VGI charging flag is ON. When the VGI charging flag is ON (YES in S13), ECU 150 enters a state in which it waits for a charging command from server 30 (which is also referred to as a "first stand-by state" below). In S14, ECU 150 in the first stand-by state determines whether or not it has received the charging command, and while it does not receive the charging command (which is also referred to as a "first stand-by period" below), it repeats processing in S12 to S14. ECU 150 may stand by in the sleep mode during the first stand-by period (that is, a period during which determination as NO is made in S14) and may be started up when it receives the charging command. In order to immediately respond to the charging command from server 30, ECU 150 may stand by in an active state.

When ECU 150 receives the charging command from server 30 (YES in S14), it carries out external charging in response to the charging command (S15). More specifically, charging and discharging control unit 520 carries out external charging under remote charging control. While charging and discharging control unit 520 continues to receive the charging command from server 30, processing in S12 to S15 is repeated.

When the VGI charging flag is OFF (NO in S13), the process proceeds to S18. When vehicle 50 is not in the externally chargeable state (NO in S12) as well, the process proceeds to S18.

In S18, charging and discharging control unit 520 determines whether or not the VGI power feed flag is ON. When the VGI power feed flag is ON (YES in S18), in S19, ECU 150 determines whether or not vehicle 50 is in an externally power-feedable state, based on outputs from various sensors. For example, when an abnormal condition (for example, communication abnormality or circuit abnormality) occurs in at least one of vehicle 50 and EVSE 40, charging and discharging control unit 520 determines that vehicle 50 is not in the externally power-feedable state. Charging and discharging control unit 520 checks a state of connection of charging cable 42, and when connection is insufficient as well, charging and discharging control unit 520 determines that vehicle 50 is not in the externally power-feedable state.

When the SOC of battery 130 is equal to or lower than the prescribed SOC value as well, charging and discharging control unit 520 determines that vehicle 50 is not in the externally power-feedable state.

When vehicle 50 is in the externally power-feedable state (YES in S19), ECU 150 enters a state in which it waits for a power feed command from server 30 (which is also referred to as a "second stand-by state" below). In S20, ECU 150 in the second stand-by state determines whether or not it has received the power feed command, and while it does not receive the power feed command (which is also referred to as a "second stand-by period" below), it repeats processing in S18 to S20. ECU 150 may stand by in the sleep mode during the second stand-by period (that is, a period during which determination as NO is made in S20), and may be started up when it receives the power feed command. In order to immediately respond to the power feed command from server 30, ECU 150 may stand by in the active state.

When ECU 150 receives the power feed command from server 30 (YES in S20), it carries out external power feed in response to the power feed command (S21). More specifically, charging and discharging control unit 520 carries out external power feed under remote power feed control. While charging and discharging control unit 520 continues to receive the power feed command from server 30, processing in S18 to S21 is repeated.

When determination as NO is made in any one of S18 and S19, the process proceeds to S22. In S22, ECU 150 turns off both of the VGI charging flag and the VGI power feed flag. For example, when the SOC of battery 130 is lowered during external power feed (S21) under remote power feed control and determination as NO is made in S19, both of the VGI charging flag and the VGI power feed flag are turned off in S22. Thereafter, the process proceeds to S23.

In S23, the vehicle system (and ECU 150) enters the stopped state (for example, the sleep mode). As processing in S23 is performed, a series of processing in FIG. 6 ends.

Figure 7:
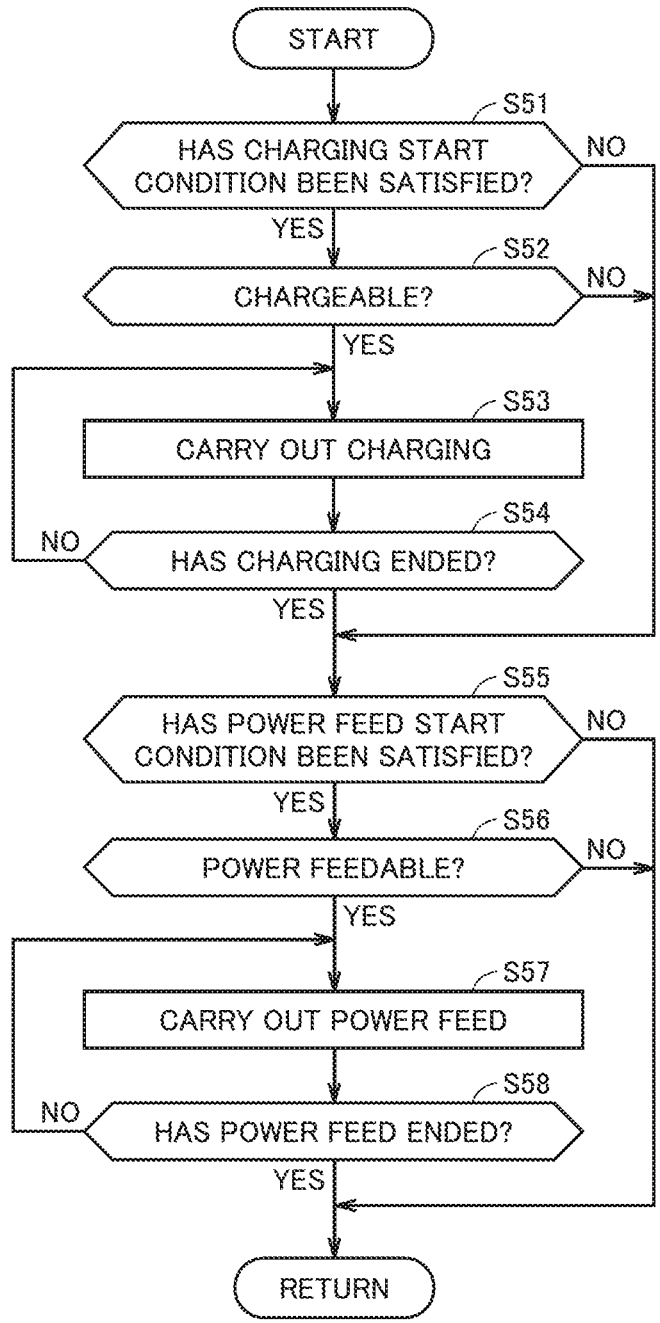
FIG. 7 is a flowchart showing control of charging and discharging of the power storage carried out by the notification controller regardless of a command from an external server.

FIG. 7 is a flowchart showing control of charging and discharging of battery 130 carried out by ECU 150 regardless of a command from server 30. Processing shown in this flowchart is repeatedly performed when both of the VGI charging flag and the VGI power feed flag are OFF.

Referring to FIG. 7 together with FIG. 3, in S51, whether or not a condition for starting external charging has been satisfied is determined. In this embodiment, when connector 43 of charging cable 42 connected to EVSE 40 is connected to inlet 110 of vehicle 50 while vehicle 50 is parked (see FIG. 1), a condition for starting immediate charging is satisfied. Immediate charging refers to external charging started immediately after completion of preparation for external charging in vehicle 50. When a user performs a prescribed charging start operation onto EVSE 40 or vehicle 50 as well, the condition for starting external charging is satisfied. Any charging start operation can be set. The charging start operation may be, for example, an operation by a user to press a prescribed button. The condition for starting external charging is satisfied also when time to start charging programmed by the timer in ECU 150 comes.

Though not shown in FIG. 7, when the condition for starting external charging is satisfied (YES in S51), a start-up signal is input to ECU 150 to start up ECU 150. Started-up ECU 150 performs processing in S52. In S52, ECU 150 determines whether or not vehicle 50 is in the externally chargeable state. Processing in S52 is the same, for example, as the processing in S12 in FIG. 6.

When vehicle 50 is in the externally chargeable state (YES in S52), in S53, charging and discharging control unit 520 carries out external charging by controlling charger-discharger 120. Thereafter, in S54, charging and discharging control unit 520 determines whether or not a condition for quitting external charging has been satisfied. While determination as NO is made in S54, external charging (S53) is continuously carried out. Any condition for quitting external charging can be set. The condition for quitting external charging may be satisfied when the SOC of battery 130 becomes equal to or higher than a prescribed SOC value during external charging, or may be satisfied when a user gives an instruction to stop charging during external charging. When the condition for quitting external charging is satisfied (YES in S54), the vehicle system (and ECU 150) is set to the stopped state (for example, the sleep mode) and thereafter the process proceeds to S55. When determination as NO is made in any one of S51 and S52 as well, the process proceeds to S55.

In S55, whether or not a condition for starting external power feed has been satisfied is determined. In this embodiment, when a user performs a prescribed power feed start operation onto EVSE 40 or vehicle 50, the condition for starting external power feed is satisfied. Any power feed start operation can be set. The power feed start operation may be, for example, an operation by a user to press a prescribed button.

Though not shown in FIG. 7, when the condition for starting external power feed is satisfied (YES in S55), a start-up signal is input to ECU 150 to start up ECU 150. Started-up ECU 150 performs processing in S56. In S56, ECU 150 determines whether or not vehicle 50 is in the externally power-feedable state. Processing in S56 is the same, for example, as the processing in S19 in FIG. 6.

When vehicle 50 is in the externally power-feedable state (YES in S56), in S57, charging and discharging control unit 520 carries out external power feed by controlling charger-discharger 120. Thereafter, in S58, charging and discharging control unit 520 determines whether or not a condition for quitting external power feed has been satisfied. While determination as NO is made in S58, external power feed (S57) is continuously carried out. Any condition for quitting external power feed can be set. The condition for quitting external power feed may be satisfied, for example, when an amount of electric power (that is, an integrated value of discharging power from battery 130) supplied from vehicle 50 to EVSE 40 during external power feed exceeds a prescribed value. The condition for quitting external power feed may be satisfied when a user gives an instruction to stop power feed during external power feed. When the condition for quitting external power feed is satisfied (YES in S58), the vehicle system (and ECU 150) enters the stopped state (for example, the sleep mode) and thereafter the process returns to S51. When determination as NO is made in any one of S55 and S56 as well, the process returns to S51.

For power leveling, server 30 may request vehicle 50 to intermittently carry out external charging or external power feed.

Figure 8:
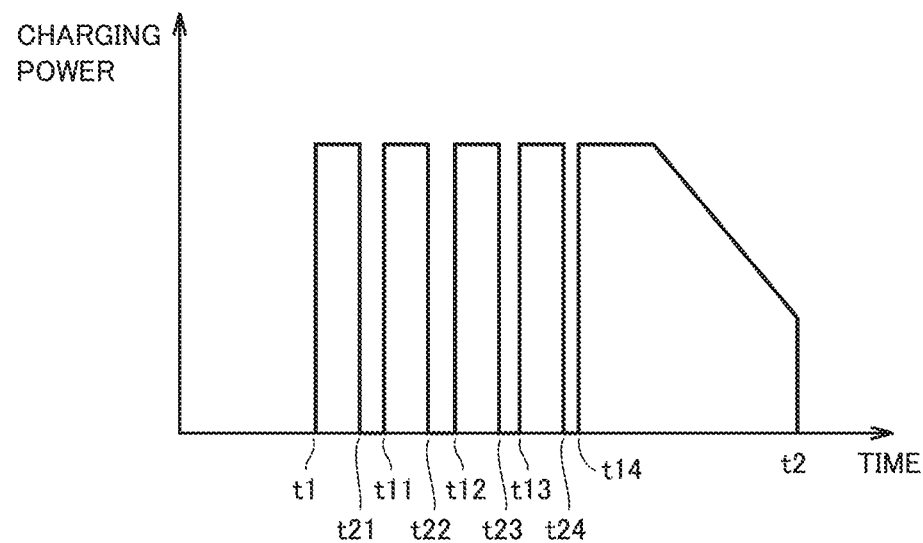
FIG. 8 is a diagram showing exemplary transition of charging power of the power storage when the notification controller intermittently carries out external charging in response to a first request from the external server.

FIG. 8 is a diagram showing exemplary transition of charging power of battery 130 when charging and discharging control unit 520 intermittently carries out external charging under remote charging control, in response to a first request from server 30. Charging and discharging control unit 520 carries out external charging under remote charging control, for example, in S15 in FIG. 6. Referring to FIG. 8, in this example, first charging is started at timing t1 and ends at timing t21. Second charging is started at timing t11 and ends at timing t22. Third charging is started at timing t12 and ends at timing t23. Fourth charging is started at timing t13 and ends at timing t24. Last charging (that is, fifth charging) is started at timing t14 and ends at timing t2.

Figure 9:
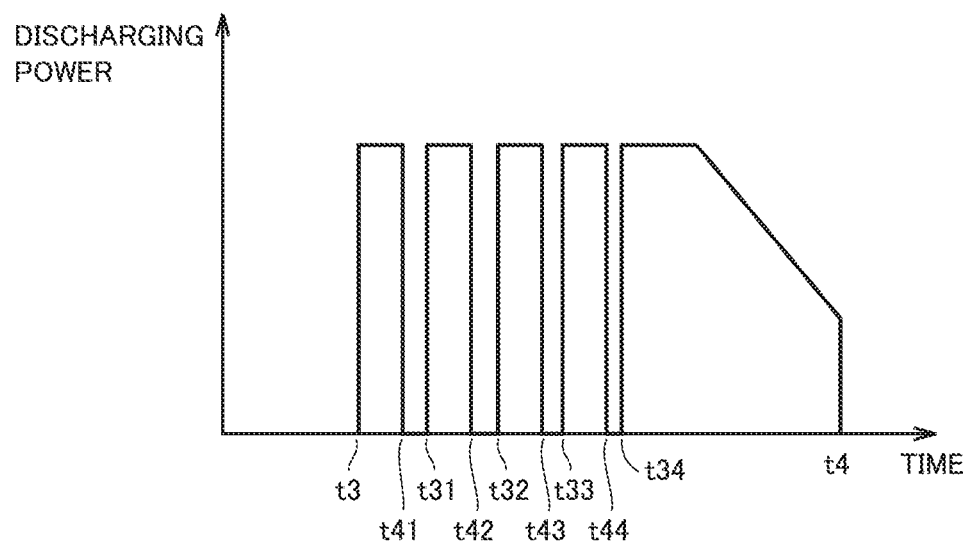
FIG. 9 is a diagram showing exemplary transition of discharging power of the power storage when the notification controller intermittently carries out external power feed in response to a second request from the external server.

FIG. 9 is a diagram showing exemplary transition of discharging power of battery 130 when charging and discharging control unit 520 intermittently carries out external power feed under remote power feed control, in response to a second request from server 30. Charging and discharging control unit 520 carries out external power feed under remote power feed control, for example, in S21 in FIG. 6. Referring to FIG. 9, in this example, first power feed is started at timing t3 and ends at timing t41. Second power feed is started at timing t31 and ends at timing t42. Third power feed is started at timing t32 and ends at timing t43. Fourth power feed is started at timing t33 and ends at timing t44. Last power feed (that is, fifth power feed) is started at timing t34 and ends at timing t4.

When a notification is given to a user each time of start and/or end of external charging in intermittent external charging as shown in FIG. 8, the user may feel bothered by the notification. When a notification is given to a user each time of start and/or end of external power feed in intermittent external power feed as shown in FIG. 9 as well, the user may feel bothered by the notification.

ECU 150 according to this embodiment restricts a frequency of notification to a user by including suppression unit 515 shown in FIG. 3. Suppression unit 515 operates in accordance with a prescribed notification mode. Processor 151 (FIG. 1) of ECU 150 variably sets the notification mode in accordance with a value of each of the VGI charging flag and the VGI power feed flag in storage 153.

Figure 10:
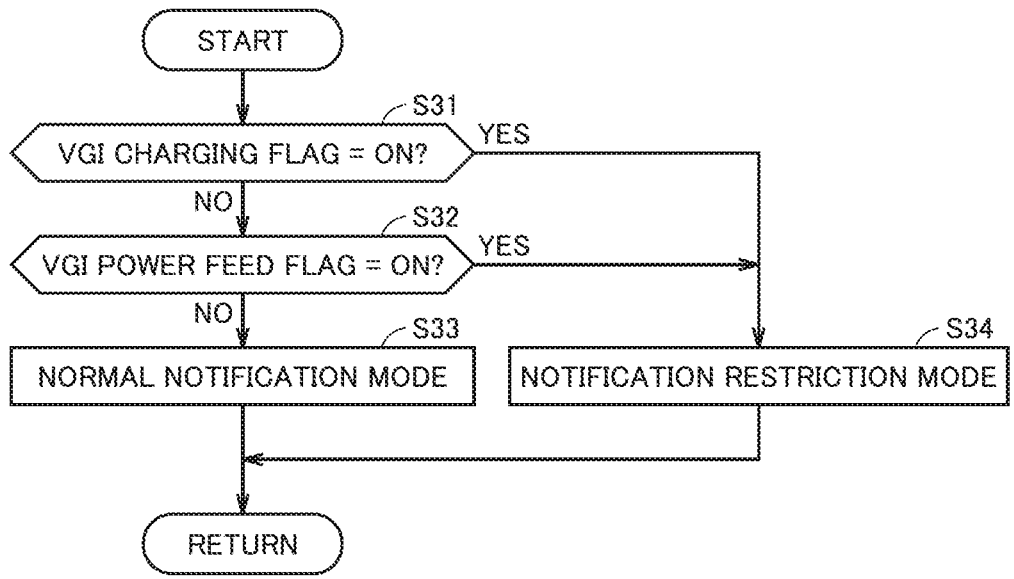
FIG. 10 is a flowchart showing processing involved with setting of a notification mode performed by the notification controller according to the embodiment of the present disclosure.

FIG. 10 is a flowchart showing processing involved with setting of the notification mode. Processing shown in this flowchart is repeatedly performed while ECU 150 is in the active state. Processing in FIG. 10 may be performed in parallel to the processing shown in FIG. 6 or 7 while the processing shown in any of FIGS. 6 and 7 is being performed.

Referring to FIG. 10, in S31, ECU 150 determines whether or not the VGI charging flag is ON. When the VGI charging flag is OFF (NO in S31), in S32, ECU 150 determines whether or not the VGI power feed flag is ON. When both of the VGI charging flag and the VGI power feed flag are OFF (NO in both of S31 and S32), in S33, a normal notification mode is set in suppression unit 515. When at least one of the VGI charging flag and the VGI power feed flag is ON (YES in any of S31 and S32), in S34, a notification restriction mode is set in suppression unit 515.

When the VGI charging flag is ON, external charging in response to a command from server 30 provided outside vehicle 50 is permitted. When the VGI charging flag is ON, ECU 150 determines that external charging is carried out in response to the command from server 30, and sets the notification restriction mode in suppression unit 515. When the VGI power feed flag is ON, external power feed in response to a command from server 30 provided outside vehicle 50 is permitted. When the VGI power feed flag is ON, ECU 150 determines that external power feed is carried out in response to the command from server 30 and sets the notification restriction mode in suppression unit 515. In this embodiment, each of the charging command and the power feed command transmitted from server 30 to vehicle 50 is based on information on supply and demand of the power network (that is, power grid PG). When ECU 150 carries out external charging or external power feed in response to such a command, external charging or external power feed may intermittently be carried out (see, for example, FIGS. 8 and 9).

Referring again to FIG. 3, while the normal notification mode is set, suppression unit 515 does not suppress notification, and while the notification restriction mode is set, it prohibits first notification to fourth notification. Suppression of notification (more specifically, prohibition of notification) carried out by suppression unit 515 will be described below with reference to FIGS. 11 to 14.

Figure 11:
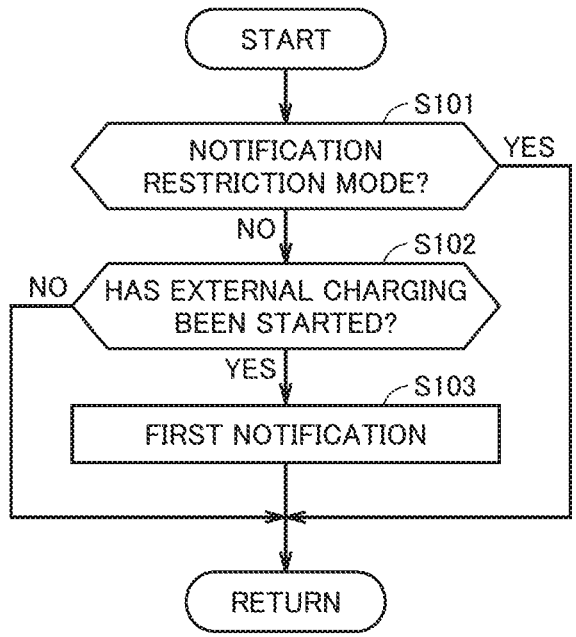
FIG. 11 is a flowchart showing first notification control carried out by the notification controller according to the embodiment of the present disclosure.

FIG. 11 is a flowchart showing first notification control carried out by notification control unit 510 of ECU 150. Processing shown in this flowchart is repeatedly performed while ECU 150 is in the active state. Processing in FIG. 11 may be performed in parallel to the processing shown in FIG. 6 or 7 while the processing shown in any of FIGS. 6 and 7 is being performed.

Referring to FIG. 11 together with FIG. 3, in S101, suppression unit 515 determines whether or not the notification restriction mode has been set therein. When the notification restriction mode has been set (YES in S101), suppression unit 515 does not allow the process to proceed to S102 or later. Thus, S101 is repeatedly performed and first notification (S103) is not carried out.

As set forth above, as the notification restriction mode is set in suppression unit 515, first notification is prohibited. When determination as YES is made in S13 in FIG. 6, the VGI charging flag is ON. Therefore, as a result of processing in S34 in FIG. 10, the notification restriction mode is set in suppression unit 515 and first notification is prohibited. Therefore, first notification is not carried out even though external charging is started in S15 in FIG. 6. When both of the VGI charging flag and the VGI power feed flag are OFF, the normal notification mode is set in suppression unit 515 as a result of the processing in S33 in FIG. 10.

When the normal notification mode is set in suppression unit 515 (NO in S101), the process proceeds to S102. In S102, first notification unit 511 determines whether or not external charging has been started. For example, at timing t1 shown in FIG. 4, it is determined that external charging has been started (YES in S102). First notification unit 511 can determine whether or not external charging has been started, for example, based on charging power of battery 130 detected by monitoring modules 121 and 131 (FIG. 1).

When determination as YES is made in S102, in S103, first notification unit 511 controls notification apparatus 170 to carry out first notification described previously. When determination as NO is made in S102, the process returns to S101 without first notification being carried out. For example, when external charging is carried out in S53 in FIG. 7, both of the VGI charging flag and the VGI power feed flag are OFF. Therefore, determination as NO is made in S101. When external charging is started in processing in S53 in FIG. 7, determination as NO is made in S101 and determination as YES is made in S102, and first notification is carried out in S103.

Figure 12:
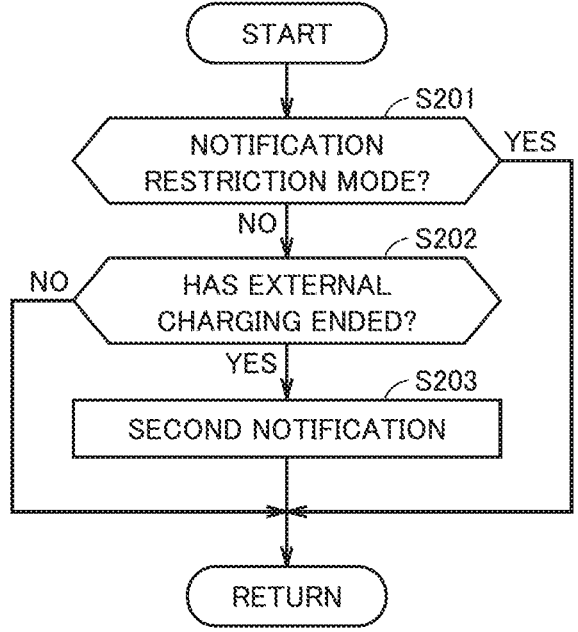
FIG. 12 is a flowchart showing second notification control carried out by the notification controller according to the embodiment of the present disclosure.

FIG. 12 is a flowchart showing second notification control carried out by notification control unit 510 of ECU 150. Processing shown in this flowchart is repeatedly performed while ECU 150 is in the active state. Processing in FIG. 12 may be performed in parallel to the processing shown in FIG. 6 or 7 while the processing shown in any of FIGS. 6 and 7 is being performed.

Referring to FIG. 12 together with FIG. 3, in S201, suppression unit 515 determines whether or not the notification restriction mode has been set therein. When the notification restriction mode has been set (YES in S201), suppression unit 515 does not allow the process to proceed to S202 or later. Thus, S201 is repeatedly performed and second notification (S203) is not carried out.

As set forth above, as the notification restriction mode is set in suppression unit 515, second notification is prohibited. When determination as YES is made in S13 in FIG. 6, the VGI charging flag is ON. Therefore, as a result of the processing in S34 in FIG. 10, the notification restriction mode is set in suppression unit 515 and second notification is prohibited. Therefore, second notification is not carried out even though ECU 150 quits external charging (that is, external charging ends) in S15 in FIG. 6. When both of the VGI charging flag and the VGI power feed flag are OFF, the normal notification mode is set in suppression unit 515 as a result of the processing in S33 in FIG. 10.

When the normal notification mode is set in suppression unit 515 (NO in S201), the process proceeds to S202. In S202, second notification unit 512 determines whether or not external charging has ended. For example, at timing t2 shown in FIG. 4, it is determined that external charging has ended (YES in S202). Second notification unit 512 can determine whether or not external charging has ended, for example, based on charging power of battery 130 detected by monitoring modules 121 and 131 (FIG. 1).

When determination as YES is made in S202, in S203, second notification unit 512 controls notification apparatus 170 to carry out second notification described previously. When determination as NO is made in S202, the process returns to S201 without second notification being carried out. For example, when external charging is carried out in S53 in FIG. 7, both of the VGI charging flag and the VGI power feed flag are OFF. Therefore, determination as NO is made in S201. When ECU 150 quits external charging (that is, external charging ends) in S53 in FIG. 7, determination as NO is made in S201 and determination as YES is made in S202, and second notification is carried out in S203.

Figure 13:
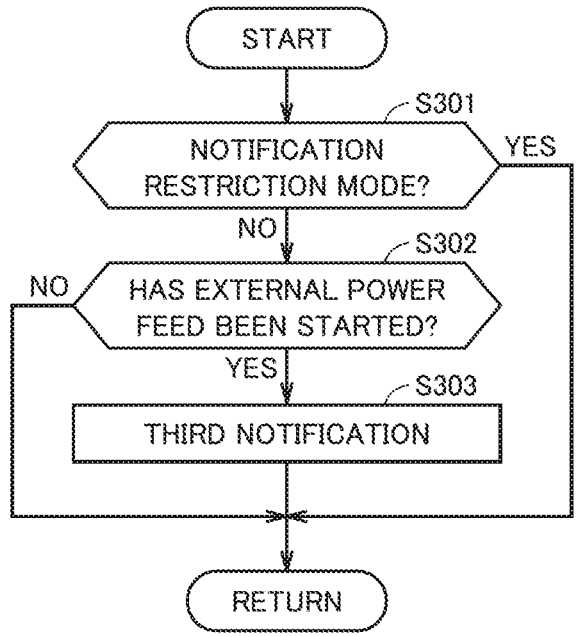
FIG. 13 is a flowchart showing third notification control carried out by the notification controller according to the embodiment of the present disclosure.

FIG. 13 is a flowchart showing third notification control carried out by notification control unit 510 of ECU 150. Processing shown in this flowchart is repeatedly performed while ECU 150 is in the active state. Processing in FIG. 13 may be performed in parallel to the processing shown in FIG. 6 or 7 while the processing shown in any of FIGS. 6 and 7 is being performed.

Referring to FIG. 13 together with FIG. 3, in S301, suppression unit 515 determines whether or not the notification restriction mode has been set therein. When the notification restriction mode has been set (YES in S301), suppression unit 515 does not allow the process to proceed to S302 or later. Thus, S301 is repeatedly performed and third notification (S303) is not carried out.

As set forth above, as the notification restriction mode is set in suppression unit 515, third notification is prohibited. When determination as YES is made in S18 in FIG. 6, the VGI power feed flag is ON. Therefore, as a result of the processing in S34 in FIG. 10, the notification restriction mode is set in suppression unit 515 and third notification is prohibited. Therefore, third notification is not carried out even though external power feed is started in S21 in FIG. 6. When both of the VGI charging flag and the VGI power feed flag are OFF, the normal notification mode is set in suppression unit 515 as a result of the processing in S33 in FIG. 10.

When the normal notification mode is set in suppression unit 515 (NO in S301), the process proceeds to S302. In S302, third notification unit 513 determines whether or not external power feed has been started. For example, at timing t3 shown in FIG. 5, it is determined that external power feed has been started (YES in S302). Third notification unit 513 can determine whether or not external power feed has been started, for example, based on discharging power of battery 130 detected by monitoring modules 121 and 131 (FIG. 1).

When determination as YES is made in S302, in S303, third notification unit 513 controls notification apparatus 170 to carry out third notification described previously. When determination as NO is made in S302, the process returns to S301 without third notification being carried out. For example, when external power feed is carried out in S57 in FIG. 7, both of the VGI charging flag and the VGI power feed flag are OFF. Therefore, determination as NO is made in S301. When external power feed is started in processing in S57 in FIG. 7, determination as NO is made in S301 and determination as YES is made in S302, and third notification is carried out in S303.

Figure 14:
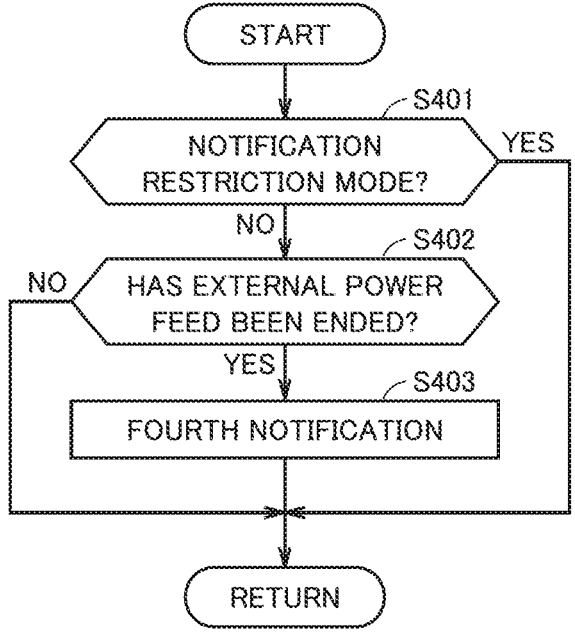
FIG. 14 is a flowchart showing fourth notification control carried out by the notification controller according to the embodiment of the present disclosure.

FIG. 14 is a flowchart showing fourth notification control carried out by notification control unit 510 of ECU 150. Processing shown in this flowchart is repeatedly performed while ECU 150 is in the active state. Processing in FIG. 14 may be performed in parallel to the processing shown in FIG. 6 or 7 while the processing shown in any of FIGS. 6 and 7 is being performed.

Referring to FIG. 14 together with FIG. 3, in S401, suppression unit 515 determines whether or not the notification restriction mode has been set therein. When the notification restriction mode has been set (YES in S401), suppression unit 515 does not allow the process to proceed to S402 or later. Thus, S401 is repeatedly performed and fourth notification (S403) is not carried out.

As set forth above, as the notification restriction mode is set in suppression unit 515, fourth notification is prohibited. When determination as YES is made in S18 in FIG. 6, the VGI power feed flag is ON. Therefore, as a result of the processing in S34 in FIG. 10, the notification restriction mode is set in suppression unit 515 and fourth notification is prohibited. Therefore, fourth notification is not carried out even though ECU 150 quits external power feed (that is, external power feed ends) in S21 in FIG. 6. When both of the VGI charging flag and the VGI power feed flag are OFF, the normal notification mode is set in suppression unit 515 as a result of the processing in S33 in FIG. 10.

When the normal notification mode is set in suppression unit 515 (NO in S401), the process proceeds to S402. In S402, fourth notification unit 514 determines whether or not external power feed has ended. For example, at timing t4 shown in FIG. 5, it is determined that external power feed has ended (YES in S402). Fourth notification unit 514 can determine whether or not external power feed has ended, for example, based on discharging power of battery 130 detected by monitoring modules 121 and 131 (FIG. 1).

When determination as YES is made in S402, in S403, fourth notification unit 514 controls notification apparatus 170 to carry out fourth notification described previously. When determination as NO is made in S402, the process returns to S401 without fourth notification being carried out. For example, when external power feed is carried out in S57 in FIG. 7, both of the VGI charging flag and the VGI power feed flag are OFF. Therefore, determination as NO is made in S401. When ECU 150 quits external power feed (external power feed ends) in S57 in FIG. 7, determination as NO is made in S401 and determination as YES is made in S402, and fourth notification is carried out in S403.

As described above, ECU 150 according to this embodiment includes first notification unit 511, second notification unit 512, third notification unit 513, fourth notification unit 514, and suppression unit 515. First notification unit 511, second notification unit 512, third notification unit 513, and fourth notification unit 514 can notify a user of vehicle 50 of start of charging, end of charging, start of discharging, and end of discharging of battery 130. When external charging or external power feed is carried out in response to a command from the external server (server 30), suppression unit 515 prohibits first notification to fourth notification. Therefore, when external charging or external power feed is repeatedly carried out in response to a command from the external server (see, for example, FIGS. 8 and 9), notification repeated to such an extent as making the user feel bothered can be suppressed.

The notification method according to this embodiment includes determination by ECU 150 as to whether or not vehicle 50 permits remote control by the external server (server 30) (S101, S201, S301, and S401 in FIGS. 11 to 14) and restriction by ECU 150 of notification (that is, first notification to fourth notification) by notification apparatus 170 when ECU 150 determines that vehicle 50 permits remote control (YES in S101, 5201, S301, and S401). In this embodiment, when at least one of the VGI charging flag and the VGI power feed flag is ON, the notification restriction mode is set in suppression unit 515 (see FIG. 10). Therefore, setting of the notification restriction mode in suppression unit 515 means permission by vehicle 50 of at least one of remote charging control and remote power feed control (and remote control by the external server).

According to the method, when vehicle 50 permits remote control by the external server, first notification to fourth notification are restricted. Therefore, even though external charging or external power feed is repeatedly carried out in response to a command from the external server, an excessively high frequency of notification can be suppressed.

Figure 15:
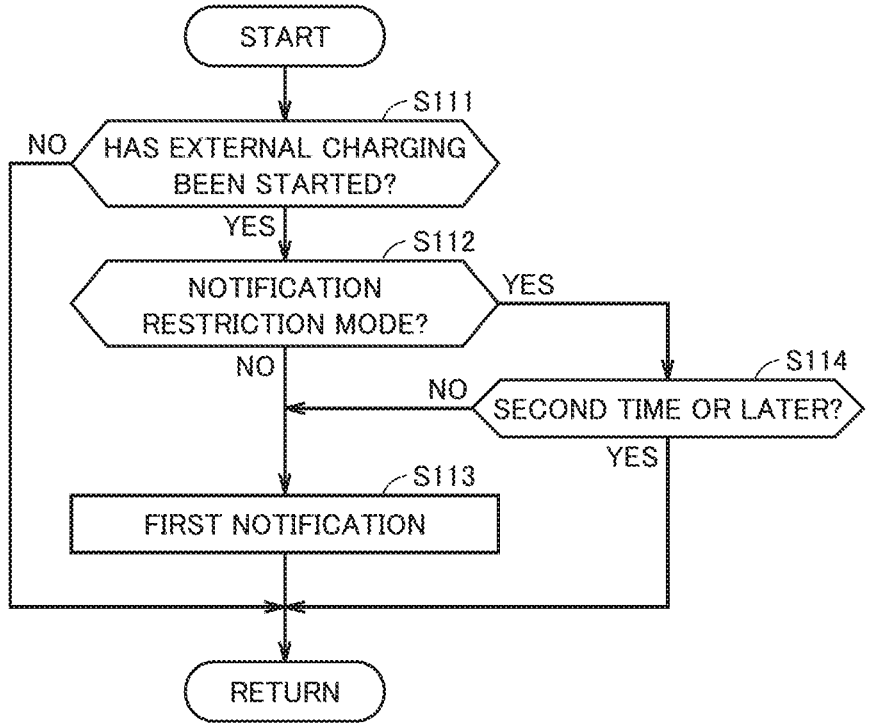
FIG. 15 is a flowchart showing a modification of first notification control shown in FIG. 11.

In the embodiment, suppression unit 515 switches between prohibition and permission of first notification to fourth notification in accordance with a value of each of the VGI charging flag and the VGI power feed flag (that is, whether or not vehicle 50 permits external charging and external power feed based on a command from the external server). Suppression of notification by suppression unit 515, however, is not limited to prohibition of notification. For example, when external charging or external power feed is intermittently carried out, suppression unit 515 may permit notification for first external charging or first external power feed. FIG. 15 is a flowchart showing a modification of first notification control shown in FIG. 11.

Referring to FIG. 15, in S111, first notification unit 511 determines whether or not external charging has been started. In S112, suppression unit 515 determines whether or not the notification restriction mode has been set therein. In S113, first notification unit 511 controls the notification apparatus (for example, at least one of notification apparatus 170 and portable terminal 80) to carry out first notification.

When external charging has been started (YES in S111), the process proceeds to S112. When the normal notification mode is set in suppression unit 515 (NO in S112), first notification is carried out in S113. When the notification restriction mode is set in suppression unit 515 (YES in S112), the process proceeds to S114.

In S114, suppression unit 515 determines whether or not external charging (which is also referred to as "present charging" below) of which start has been sensed in S111 falls under charging for the second time or later in intermittent charging. For example, when timing of start of present charging comes before lapse of a prescribed time period since end (or start) of previous charging, suppression unit 515 may determine that present timing falls under charging for the second time or later in intermittent charging (YES in S114). When present charging falls under first charging in intermittent charging, determination as NO is made in S114. When present charging is not a part of intermittent charging but one-shot charging (for example, charging shown in FIG. 4) as well, determination as NO is made in S114.

When suppression unit 515 makes determination as YES in S114, it does not allow the process to proceed to S113. First notification is thus not carried out. When suppression unit 515 makes determination as NO in S114, the process proceeds to S113. Thus, first notification is carried out in S113. For example, when intermittent charging shown in FIG. 8 is carried out, at timing t1, present charging falls under first charging in intermittent charging and hence determination as NO is made in S114 and first notification is carried out in S113. Thereafter, at timing t11, since the present charging falls under second charging in intermittent charging, determination as YES is made in S114 and first notification is not carried out. At timing t12, timing t13, and timing t14 as well, present charging falls under charging for the second time or later in intermittent charging and hence determination as YES is made in S114 and first notification is not carried out.

In the modification, when external charging is intermittently carried out, suppression unit 515 suppresses first notification and prevents first notification from being carried out for external charging for the second time or later. As suppression unit 515 thus suppresses notification, a frequency of notification is restricted. Therefore, notification repeated to such an extent as making the user feel bothered can be suppressed. Though FIG. 15 shows the modification in connection with first notification, similar modification is also applicable to second notification control to fourth notification control shown in FIGS. 12 to 14.

Control of charging and discharging of battery 130 based on remote control is not limited to the processing in FIG. 6 described previously. Though external charging under remote charging control may be carried out when both of the VGI charging flag and the VGI power feed flag are ON in the processing in FIG. 6, external power feed under remote power feed control may be carried out. ECU 150 may determine which of external charging under remote charging control and external power feed under remote power feed control is to be carried out, based on the SOC of battery 130. ECU 150 may wait for a command (the charging command and the power feed command) from the external server (for example, server 30) in a state in which it is both externally chargeable under remote charging control and externally power-feedable under remote power feed control, by adjusting the SOC of battery 130. A switching scheme (that is, a scheme in which when any one of the VGI charging flag and the VGI power feed flag is ON, the other is OFF) may be adopted such that both of the VGI charging flag and the VGI power feed are not ON. Though the VGI charging flag and the VGI power feed flag are adopted such that remote charging control and remote power feed control can individually be permitted in the embodiment, one flag indicating whether or not to permit remote control by the external server may be adopted instead of the VGI charging flag and the VGI power feed flag.

After the notification apparatus (for example, at least one of notification apparatus 170 and portable terminal 80) carries out any of first notification and second notification, suppression unit 515 may prohibit first notification and second notification until a prescribed first period elapses. FIG. 16 is a flowchart showing a modification of first notification control and second notification control shown in FIGS. 11 and 12. The notification mode is not adopted in the modification described below. Therefore, the notification mode shown in FIG. 10 is not set. Each of first notification and second notification will be referred to as "charging notification" below unless they are described as being distinguished from each other.

Referring to FIG. 16, in S501, suppression unit 515 determines whether or not a prescribed time period has elapsed since previous notification (that is, recent charging notification). Suppression unit 515 does not allow the process to proceed to S502 until the prescribed time period elapses since one of first notification and second notification was carried out. First notification and second notification are thus not carried out. When the prescribed time period has elapsed since one of first notification and second notification was carried out, determination as YES is made in S501 and the process proceeds to S502.

In S502, first notification unit 511 determines whether or not external charging has been started. When determination as YES is made in S502, in S503, first notification unit 511 controls the notification apparatus (for example, at least one of notification apparatus 170 and portable terminal 80) to carry out first notification. When determination as NO is made in S502, the process proceeds to S504.

In S504, second notification unit 512 determines whether or not external charging has ended. When determination as YES is made in S504, in S505, second notification unit 512 controls the notification apparatus (for example, at least one of notification apparatus 170 and portable terminal 80) to carry out second notification. When determination as NO is made in S504, the process returns to S501.

In the modification, once first notification or second notification is carried out, first notification and second notification are prohibited until a prescribed time period elapses. Therefore, even though external charging is repeatedly carried out, an excessively high frequency of notification can be suppressed. In the modification, a period from the time point when any of first notification and second notification is carried out until a prescribed time period elapses corresponds to an exemplary "first period" according to the present disclosure. Without being limited thereto, any first period can be set. For example, a prescribed travel distance may be adopted instead of the prescribed time period.

After the notification apparatus (for example, at least one of notification apparatus 170 and portable terminal 80) carries out any of third notification and fourth notification, suppression unit 515 may prohibit third notification and fourth notification until a prescribed second period elapses. FIG. 17 is a flowchart showing a modification of third notification control and fourth notification control shown in FIGS. 13 and 14. In the modification described below, the notification mode is not adopted. Therefore, the notification mode shown in FIG. 10 is not set. Each of third notification and fourth notification will be referred to as "power feed notification" below unless they are described as being distinguished from each other.

Referring to FIG. 17, in S601, suppression unit 515 determines whether or not a prescribed time period has elapsed since previous notification (that is, recent power feed notification). Suppression unit 515 does not allow the process to proceed to S602 until the prescribed time period elapses since one of third notification and fourth notification was carried out. Third notification and fourth notification are thus not carried out. When the prescribed time period has elapsed since one of third notification and fourth notification was carried out, determination as YES is made in S601 and the process proceeds to S602.

In S602, third notification unit 513 determines whether or not external power feed has been started. When determination as YES is made in S602, in S603, third notification unit 513 controls the notification apparatus (for example, at least one of notification apparatus 170 and portable terminal 80) to carry out third notification. When determination as NO is made in S602, the process proceeds to S604.

In S604, fourth notification unit 514 determines whether or not external power feed has ended. When determination as YES is made in S604, in S605, fourth notification unit 514 controls the notification apparatus (for example, at least one of notification apparatus 170 and portable terminal 80) to carry out fourth notification. When determination as NO is made in S604, the process returns to S601.

In the modification, once third notification or fourth notification is carried out, third notification and fourth notification are prohibited until a prescribed time period elapses. Therefore, even though external power feed is repeatedly carried out, an excessively high frequency of notification can be suppressed. In the modification, a period from the time point when any of third notification and fourth notification is carried out until a prescribed time period elapses corresponds to an exemplary "second period" according to the present disclosure. Without being limited thereto, any second period can be set. For example, a prescribed travel distance may be adopted instead of the prescribed time period.

It is not essential that ECU 150 includes all of first notification unit 511, second notification unit 512, third notification unit 513, and fourth notification unit 514 and carries out all of first notification to fourth notification. ECU 150 should only include at least one of first notification unit 511, second notification unit 512, third notification unit 513, and fourth notification unit 514. For example, ECU 150 may include only first notification unit 511 and second notification unit 512 to carry out first notification control and second notification control shown in FIGS. 11 and 12 (or the modification shown in FIG. 16). Alternatively, ECU 150 may include only third notification unit 513 and fourth notification unit 514 to carry out third notification control and fourth notification control shown in FIGS. 13 and 14 (or the modification shown in FIG. 17). ECU 150 may include only any one (for example, first notification unit 511) selected from among first notification unit 511, second notification unit 512, third notification unit 513, and fourth notification unit 514.

The configuration of the electric power system is not limited to the configuration shown in FIG. 2. The electric power utility company may be divided for each business sector. A power generation utility and a power transmission and distribution utility included in the electric power system may belong to companies different from each other. In the embodiment, though an electric power utility company requests an aggregator to participate in DR, the power market may request an aggregator to participate in DR. The aggregator may make a profit by trading in the power market (for example, trading of a capacity or adjustment capability).

A configuration of the vehicle is not limited to the configuration shown in FIG. 1. For example, in the configuration shown in FIG. 1, a charging apparatus capable only of external charging or a power feed apparatus capable only of external power feed may be adopted instead of charger-discharger 120.

The notification controller, the electric power system, and the notification method described above may be applied to a mobile body other than the vehicle. The mobile body may be transportation means (a ship or an airplane) other than the vehicle or an unmanned mobile body (an automated guided vehicle (AGV), an agricultural implement, a movable robot, or a drone). The notification apparatus may be carried by a manager of a mobile body (for example, a manager of a drone).

Though an embodiment of the present disclosure has been described, it should be understood that the embodiment disclosed herein is illustrative and non-restrictive in every respect. The scope of the present disclosure is defined by the terms of the claims and is intended to include any modifications within the scope and meaning equivalent to the terms of the claims.

What is claimed is:

1. A notification controller that controls a notification apparatus that gives a notification to a user of a mobile body including a power storage, wherein
the notification controller controls the notification apparatus to carry out at least one of
first notification to notify, when external charging is started, the user of start of the external charging, the external charging being charging of the power storage with electric power supplied from outside of the mobile body,
second notification to notify, when external charging ends, the user of end of the external charging, the external charging being charging of the power storage with electric power supplied from outside of the mobile body,
third notification to notify, when external power feed is started, the user of start of the external power feed, the external power feed being feed of electric power stored in the power storage to outside of the mobile body, and
fourth notification to notify, when external power feed ends, the user of end of the external power feed, the external power feed being feed of electric power stored in the power storage to outside of the mobile body,
the notification controller carries out suppression control to restrict a frequency of notification by the notification apparatus by suppressing notification by the notification apparatus.

2. The notification controller according to claim 1, wherein
the notification controller carries out at least one of the first notification and the second notification, and
the suppression control is control for prohibiting the first notification and the second notification until a prescribed first period elapses after the notification apparatus carries out any of the first notification and the second notification.

3. The notification controller according to claim 1, wherein
the notification controller carries out at least one of the third notification and the fourth notification, and
the suppression control is control for prohibiting the third notification and the fourth notification until a prescribed second period elapses after the notification apparatus carries out any of the third notification and the fourth notification.

4. The notification controller according to claim 1, wherein
the notification controller carries out at least one of the first notification and the second notification, and
the suppression control is control for suppressing at least one of the first notification and the second notification when the external charging is carried out in response to a command from a server provided outside the mobile body.

5. The notification controller according to claim 4, wherein
the suppression control is control for prohibiting the first notification and the second notification when the external charging is carried out in response to the command from the server provided outside the mobile body.

6. The notification controller according to claim 1, wherein
the notification controller carries out at least one of the third notification and the fourth notification, and
the suppression control is control for suppressing at least one of the third notification and the fourth notification when the external power feed is carried out in response to a command from a server provided outside the mobile body.

7. The notification controller according to claim 6, wherein
the suppression control is control for prohibiting the third notification and the fourth notification when the external power feed is carried out in response to the command from the server provided outside the mobile body.

8. The notification controller according to claim 4, wherein
the command from the server is based on information on supply and demand of a power grid.

9. A mobile body comprising the notification controller according to claim 1.

10. The mobile body according to claim 9, wherein
the mobile body is a vehicle,
the notification controller carries out at least one of the first notification and the second notification, and
the vehicle includes
the power storage that stores electric power for traveling,
the notification apparatus controlled by the notification controller,
an inlet that receives electric power supplied from outside of the vehicle,
a charging apparatus that carries out first power conversion onto electric power received at the inlet and supplies electric power resulting from the first power conversion to the power storage,
a vehicle controller that carries out the external charging by controlling the charging apparatus, and
a communication apparatus that establishes wireless communication with outside of the vehicle.

11. The mobile body according to claim 10, wherein
the notification controller carries out at least one of the third notification and the fourth notification,
the vehicle further includes a power feed apparatus that carries out second power conversion onto electric power discharged from the power storage and supplies electric power resulting from the second power conversion to the inlet,
the inlet provides electric power supplied from the power feed apparatus to outside of the vehicle, and
the vehicle controller carries out the external power feed by controlling the power feed apparatus.

12. An electric power system comprising:
the notification controller according to claim 1;
the mobile body including the power storage;

the notification apparatus that is controlled by the notification controller and gives a notification to a user of the mobile body;
a plurality of electric power facilities electrically connectable to the mobile body;
a power grid that supplies electric power to each of the plurality of electric power facilities; and
a server that issues at least one of
- a first request that requests the mobile body to increase demand for electric power supplied by the power grid, and
- a second request that requests the mobile body to carry out backfeeding to the power grid.

13. A notification method performed by a notification apparatus that gives a notification to a user of a mobile body including a power storage, of giving a notification about at least one of start of charging of the power storage, end of charging of the power storage, start of discharging of the power storage, and end of discharging of the power storage, the notification method comprising:
determining, by a notification controller, whether the mobile body permits remote control by a server provided outside the mobile body; and
restricting, by the notification controller, the notification by the notification apparatus when the notification controller determines that the mobile body permits the remote control.

* * * * *